US009152623B2

(12) United States Patent
Wroczyński et al.

(10) Patent No.: US 9,152,623 B2
(45) Date of Patent: Oct. 6, 2015

(54) NATURAL LANGUAGE PROCESSING SYSTEM AND METHOD

(71) Applicant: Fido Labs Inc., Palo Alto, CA (US)

(72) Inventors: Michal Wroczyński, Gdynia (PL); Tomasz Krupa, Sopot (PL); Gniewosz Leliwa, Gdansk (PL); Piotr Wiacek, Gdansk (PL); Michal Stańczyk, Gdansk (PL)

(73) Assignee: Fido Labs, Inc., Palo Alto, CA (US)

( * ) Notice: Subject to any disclaimer, the term of this patent is extended or adjusted under 35 U.S.C. 154(b) by 0 days.

(21) Appl. No.: 14/071,631

(22) Filed: Nov. 4, 2013

(65) Prior Publication Data

US 2014/0136188 A1    May 15, 2014

Related U.S. Application Data

(60) Provisional application No. 61/721,792, filed on Nov. 2, 2012.

(51) Int. Cl.
*G06F 17/28* (2006.01)

(52) U.S. Cl.
CPC .................. *G06F 17/2872* (2013.01)

(58) Field of Classification Search
CPC ..... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2675; G06F 17/277; G06F 17/2775
USPC ............... 704/1, 9, 10; 707/706–708, 1, 9, 10
See application file for complete search history.

(56) References Cited

U.S. PATENT DOCUMENTS 5,794,050 A    8/1998 Dahlgren
5,864,788 A *  1/1999 Kutsumi ........................ 704/2

(Continued)

FOREIGN PATENT DOCUMENTS

CA    2009042 A1    8/1980
CA    1301345 C     5/1992

(Continued)

OTHER PUBLICATIONS

Manning Ch.D. (2011). Part-of-Speech Tagging from 97% to 100%: Is It Time for Some Linguistics? Paragraphs 1, 2 (introduction). In CICLing.

(Continued)

*Primary Examiner* — Lamont Spooner
(74) *Attorney, Agent, or Firm* — Courtney IP Law; Barbara B. Courtney

(57) ABSTRACT

A natural language processing system is disclosed herein. Embodiments of the NLP system perform hand-written rule-based operations that do not rely on a trained corpus. Rules can be added or modified at any time to improve accuracy of the system, and to allow the same system to operate on unstructured plain text from many disparate contexts (e.g. articles as well as twitter contexts as well as medical articles) without harming accuracy for any one context. Embodiments also include a language decoder (LD) that generates information which is stored in a three-level framework (word, clause, phrase). The LD output is easily leveraged by various software applications to analyze large quantities of text from any source in a more sophisticated and flexible manner than previously possible. A query language (LDQL) for information extraction from NLP parsers' output is disclosed, with emphasis on its embodiment implemented for LD. It is also presented, how to use LDQL for knowledge extraction on the example of application named Knowledge Browser.

24 Claims, 35 Drawing Sheets

(56) References Cited

U.S. PATENT DOCUMENTS

| | | | |
|---|---|---|---|
| 6,112,168 | A | 8/2000 | Corston et al. |
| 6,952,666 | B1 | 10/2005 | Weise |
| 7,010,479 | B2 | 3/2006 | Murata |
| 7,024,350 | B2 | 4/2006 | Schmid |
| 7,475,010 | B2 | 1/2009 | Chao |
| 7,689,410 | B2 | 3/2010 | Chang |
| 8,527,262 | B2 | 9/2013 | Kambhatla |
| 8,583,422 | B2 | 11/2013 | Todhunter |
| 8,600,728 | B2 | 12/2013 | Knight |
| 8,600,734 | B2 | 12/2013 | Warner |
| 8,600,736 | B2 * | 12/2013 | Ball ................................ 704/9 |
| 8,612,232 | B2 | 12/2013 | Bangalore |
| 8,639,493 | B2 | 1/2014 | Haug |
| 8,639,495 | B2 | 1/2014 | Eggebraaten |
| 8,645,124 | B2 | 2/2014 | Zangvil |
| 2003/0074188 | A1 * | 4/2003 | Murata et al. .................. 704/9 |
| 2003/0182102 | A1 * | 9/2003 | Corston-Oliver et al. ........ 704/9 |
| 2003/0233225 | A1 * | 12/2003 | Bond et al. .................... 704/4 |
| 2005/0060139 | A1 * | 3/2005 | Corston-Oliver et al. ........ 704/1 |
| 2007/0033004 | A1 * | 2/2007 | Bangalore et al. ................ 704/9 |
| 2007/0179776 | A1 | 8/2007 | Segond et al. |
| 2007/0260450 | A1 * | 11/2007 | Sun ................................ 704/9 |
| 2008/0275694 | A1 * | 11/2008 | Varone ............................ 704/9 |
| 2009/0292700 | A1 | 11/2009 | Castellani et al. |
| 2010/0030553 | A1 * | 2/2010 | Ball ................................ 704/9 |
| 2010/0063796 | A1 * | 3/2010 | Rehberg et al. ................. 704/9 |
| 2010/0332217 | A1 * | 12/2010 | Wintner et al. ................. 704/9 |
| 2012/0253793 | A1 * | 10/2012 | Ghannam et al. ................ 704/9 |
| 2013/0151236 | A1 * | 6/2013 | Iofinov ............................ 704/9 |

FOREIGN PATENT DOCUMENTS

| | | |
|---|---|---|
| EP | 0467527 A2 | 1/1992 |
| EP | 1302861 B1 | 4/2009 |
| WO | 9800833 A1 | 1/1998 |
| WO | 9917223 A1 | 4/1999 |
| WO | 0030070 A2 | 5/2000 |
| WO | 2001011492 A1 | 2/2001 |
| WO | 02035376 A3 | 8/2003 |
| WO | 2008059111 A2 | 5/2008 |

OTHER PUBLICATIONS

Marquez L., Padro L., Rodriguez M. (2000). A Machine Learning Approach to POS Tagging. Paragraph 1.1. Kluwer Academic Publishers.

Tjong Kim Sang E. F., Déjean H. (2001). Introduction to the CoNLL-2001 Shared Task: Clause Identification. Proceedings of CoNLL-2001. Paragraphs 1, 2, 4, 6.

Bunt H., Merlo P., Nivre J. (2010). Trends in Parsing Technology. Chapters 1.1, 1.2 (introduction), 12 2.1, 1.2 1.2.3. Springer.

Palmer M., Gildea D., Xue E. (2010). Semantic Role Labelling. Synthesis Lectures on Human Language Technologies. Chapters 1.1, 1.2, 3 (introduction), 3.1, 5. Morgan & Claypool Publishers.

De Marneffe M., Manning Ch. D. (2008) The Stanford typed dependencies representation. Proceedings of the workshop on Cross-Framework and Cross-Domain Parser Evaluation. Paragraphs 1, 2.1. Association for Computational Linguistics.

De Marneffe M., MacCartney B., Manning Ch. D. (2006) Generating typed dependency parses from phrase structure parses. Paragraphs 1, 3. In LREC 2006.

Charniak E. (1997), Statistical Parsing with a Context-Free Grammar and Word Statistics. Paragraphs "introduction", the "algorithm". In AAAI/IAAI, p. 598-603.

Ghassan Kanaan, Riyad Al-Shalabi, Majdi Sawalha, Full Automatic Arabic Text Tagging System, University of Leeds, School of Computing, http://www.comp.leeds.ac.uk/sawalha/sawalha03icitns.pdf.

Kannan et al. Full Automatic Arabic Text Tagging System. ICITNS 2003 International Conference on Information Technology and Natural Sciences. [retrieved on May 28, 2014) Retrieved from the Internet: < URL: http://www.zuj.edu.jo/conferences/ICIT03/2003/Database andinformationretrievai/IT111.pdf>.

* cited by examiner

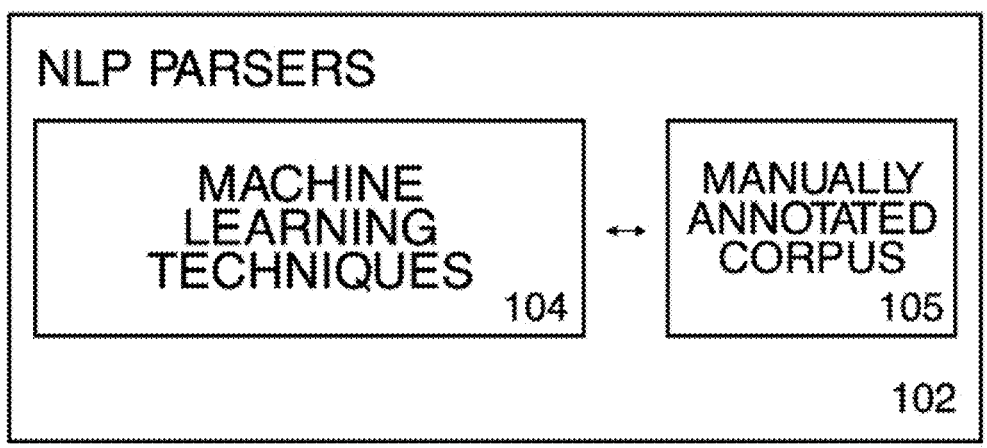
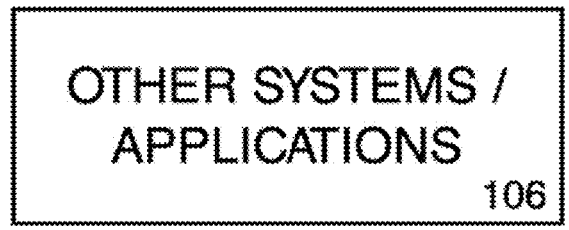
METHODOLOGY OF
PRIOR ART OF NLP PARSERS    FIG. 1

1. Input.

DTA NS PP VCD JJT NS VLD DTD NS
The man I saw last night became my friend.
  predicate     predicate Clause divider takes set of tagged words within one sentence.

2. Scrapper.

DTA NS PP VCD JJT NS VLD DTD NS
The man I saw last night became my friend.
NP   NP predicate   AP   predicate   NP Grouping words (excluding predicates) into scraps.
Word The is grouped with man making NP scrap,
word last is grouped with night making AP scrap,
word my is grouped with friend making NP scrap.
Word I makes NP scrap alone.

FIG. 9

5. Nodes extraction.

DTA NS PP VCD JJT NS VLD OTJ NS
The man I saw last night became my friend.
NP NP predicate AP predicate NP In this example none of the clauses are starting with potential node.

clauses: {{I, saw, last night}, {The man, became, my friend}}

6. Clause connection detection.

DTA NS PP VCD JJT NS VLD OTJ NS
The man I saw last night became my friend.
NP NP predicate AP predicate NP Directed connection between first and second clause is detected.

clauses: {{I, saw, last night}, {The man, became, my friend}}

DTA NS PP VCD JJT NS VLD OTJ NS
The man I saw last night became my friend.
NP NP predicate AP predicate NP Additionaly connection between first clause and first scrap from second clause is detected.

clauses: {{I, saw, last night}, {The man, became, my friend}}

FIG. 13

7. Clause type clasification.

DTA   NS   PP VCD   JJT   NS   VLD   DTJ   NS
The man I saw last night became my friend.
NP      NP predicate      AP      predicate      NP First clause is given Complement clause type
because of its connection to the particular scrap rather than whole clause.
Second clause is denoted as Main clause by default.

clauses: {{I, saw, last night}, {The man, became, my friend}}
        Complement clause        Main clause

8. Output.

DTA   NS   PP VCD   JJT   NS   VLD   DTJ   NS
The man I saw last night became my friend.
NP      NP predicate      AP      predicate      NP

↓ clauses: {{I, saw, last night}, {The man, became, my friend}}
        Complement clause        Main clause

FIG. 14

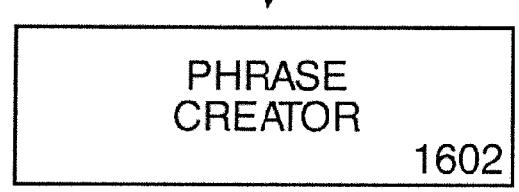
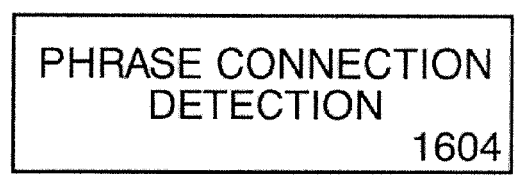
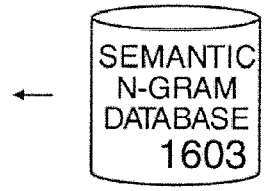
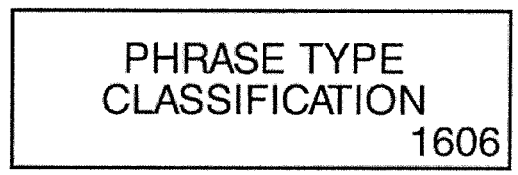
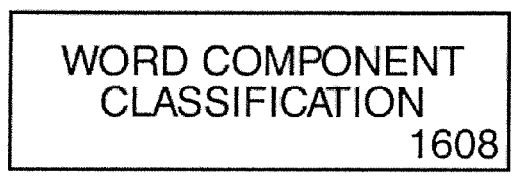
FIG. 16

1. Input.

| NS | NS | VBD | NS | IN | NS | NS | NP |
|---|---|---|---|---|---|---|---|
| Construction | worker | bought | coffee | with | milk | and | cigarettes |
| NP | NP | predicate | NP | PP | CN | | NP |

Accomodator engine takes set of scraps within one clause.

2. Creating phrases.

| NS | NS | VBD | NS | IN | NS | NS | NP |
|---|---|---|---|---|---|---|---|
| Construction | worker | bought | coffee | with | milk | and | cigarettes |
| NP | | predicate | NP | P | NP | CN | NP |

This section creates phrases by minor scrap manipulations (merging, dividing and type changing).

3. Connecting phrases.

| NS | NS | VBD | NS | IN | NS | NS | NP |
|---|---|---|---|---|---|---|---|
| Construction | worker | bought | coffee | with | milk | and | cigarettes |
| NP | | predicate | NP | P | NP | CN | NP | stack: {construction worker}

First step is to connect 'construction worker' to a predicate because of its position. Then 'construction worker' phrase is added to the stack (only NP and P phrases can be added to the stack).

FIG. 18

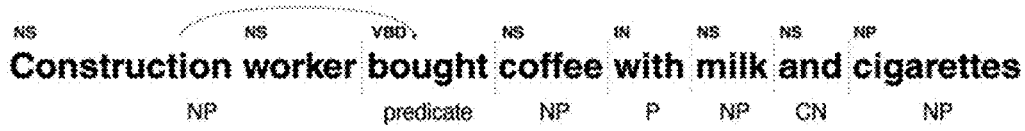
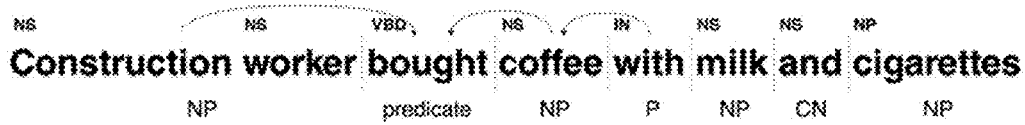
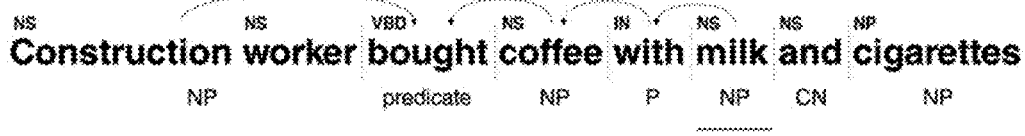
FIG. 19

4. Phrase classification.
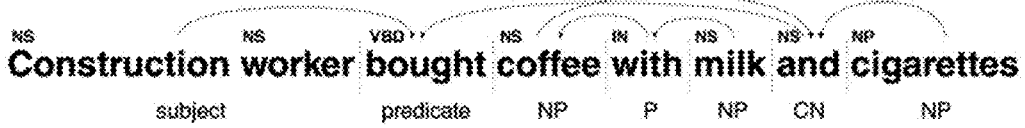
"Construction worker" phrase gets SUBJECT for its type because of position and connection to predicate.
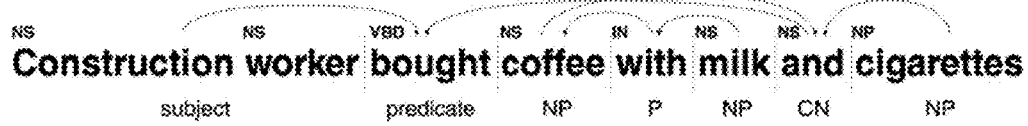
Predicate phrase type was given by the Clause Divider module.
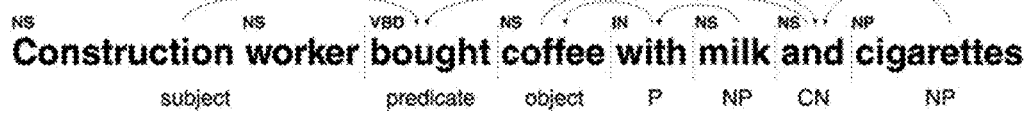
"Coffee" phrase gets its type because of its position and relation to predicate.
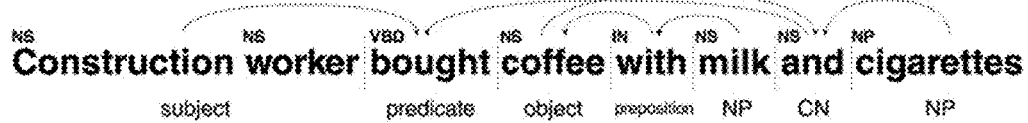
"With" scrap type (P) is changed to preposition phrase type.
FIG. 21

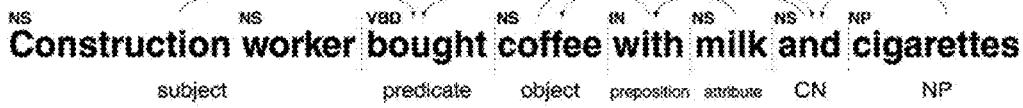
"Milk" phrase gets its type because of relation to a prepositional phrase.
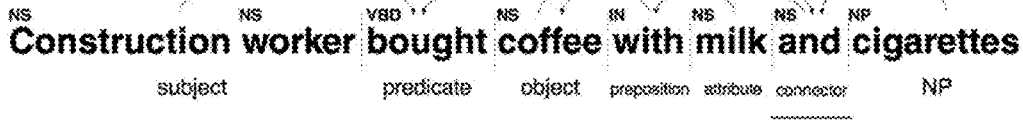
"And" gets its type because it is linking other phrases.
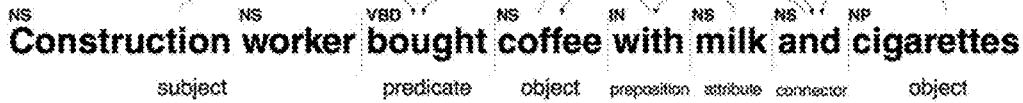
"Cigarettes" gets attribute type because of relation to perticular connector.
5. Word categorization.
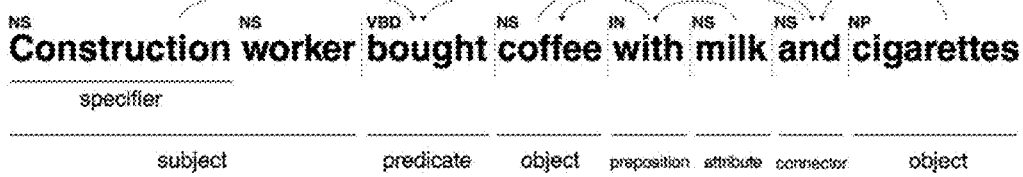
Word "construction" gets specifier component because it is a noun describing phrase core.
FIG. 22

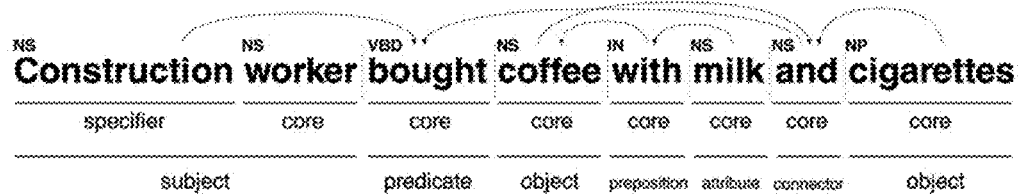
Rest of the words from the sentence gets core component because they are single within corresponding phrases and are not modifying any other phrases.
6. Connecting words within phrases.
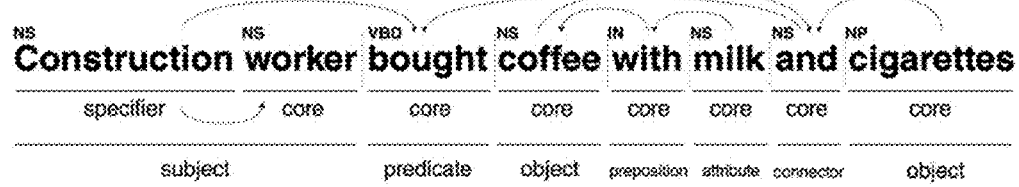
All specifying words are connected to core of phrase.
Rest of the words from sentence are not considered here because they are single within corresponding phrases.
7. Output.
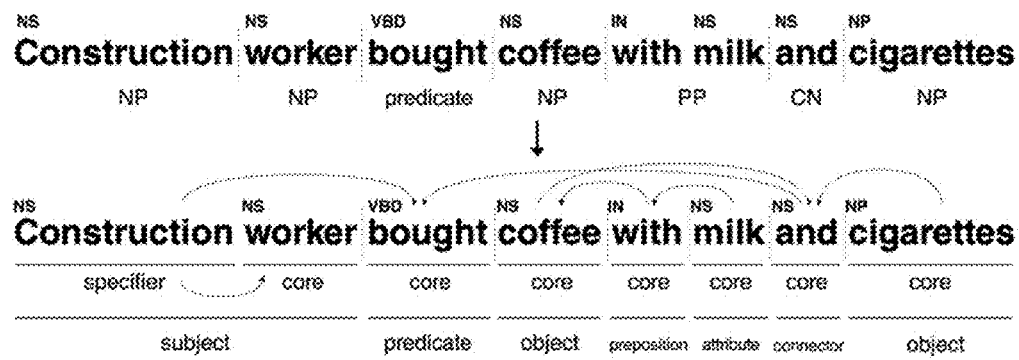
FIG. 23

CLAUSE LEVEL
(6 types)
CONNECTIONS
CLAUSE → CLAUSE
CLAUSE → PHRASE
CLAUSE → WORD
PHRASE LEVEL
(8 types)
 
CONNECTIONS
PHRASE → PHRASE
PHRASE → WORD
WORD LEVEL
(6 types for predicate)
(1 type for connector, irrelevant, preposition)
(14 types otherwise)
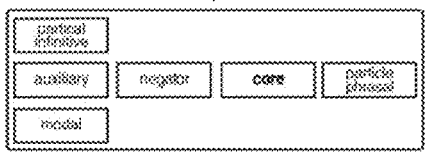
CONNECTIONS
WORD → WORD
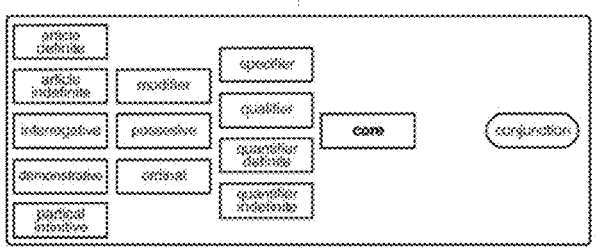
FIG. 25

TEXT INPUT
("The chicken in this restaurant is very delicious
and the music is awful!
I want to say that the sea view is awesome!")

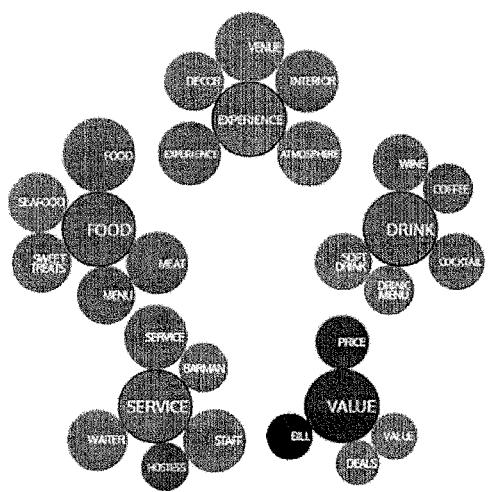 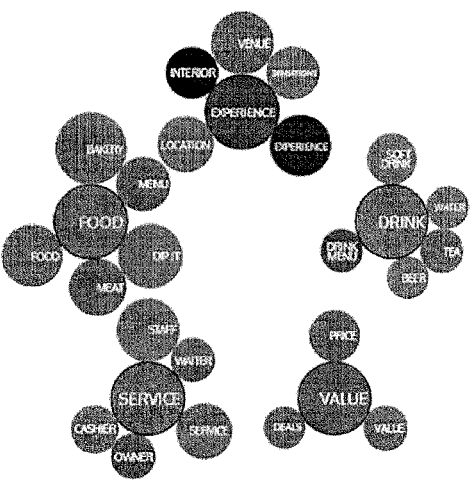
RESTAURANT ONE     RESTAURANT TWO
FIG. 33

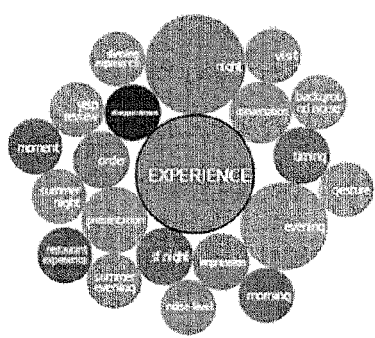 
RESTAURANT ONE    RESTAURANT TWO
FIG. 34

NATURAL LANGUAGE PROCESSING SYSTEM AND METHOD

RELATED APPLICATIONS

This application claims the benefit of U.S. Provisional Patent Application No. 61/721,792, filed Nov. 2, 2012, which is incorporated by reference herein in its entirety.

FIELD OF THE INVENTION

Inventions disclosed and claimed herein are in the field of natural language processing (NLP)

BACKGROUND

Natural language processing (NLP) systems are computer-implemented methods for taking natural language input (for example, computer-readable text), and operating on the input so as to generate output that is useful for computers to derive meaning. Examples of NLP systems applications include spell checkers/grammar checkers, machine translation systems, and speech-to-text systems. Increasingly, there is interest in developing methods for machines to more intelligently interpret human language input data (such as text) for the purpose of directing the computer as if it were another person who could understand speech. One application for such methods is search engines that receive a typed query from a person and perform web searches to attempt to generate a set of meaningful answers to the query. An important subclass of NLP systems is NLP parsers, especially grammatical parsers such as Part-Of-Speech tagger, constituency parsers, dependency parsers, and shallow semantic parsers such as SRL (Semantic Role Labeling). Their role is to preprocess text and add additional information to words to prepare it for further usage. Current NLP systems are mostly built on top of NLP parsers and current NLP systems rely heavily on the information produced by these parsers to provide features and accuracy. Quality of the information delivered by these parsers is strongly correlated with the efficiency of NLP systems.

FIG. 1 is a block diagram of prior art NLP parsers 100. The input is a text, which is processed by NLP parser (102) consisting of machine learning techniques (104) trained on manually annotated corpus (105). The parser (102) produces the output (103) which is then used by other systems/applications (106).

All current parsers are dependent on corpora and therefore on the context in which they were written. Typically corpora are in a context of correctly written, grammatically correct sentences and common syntactic structures which are manually annotated by humans. The system is then trained using this corpus.

This is one reason that traditional NLP parsers are most accurate on the same type of content they were trained on (the same corpus). That is why always-changing language, such as user generated content (e.g. reviews, tips, comments tweets, social media content) presents a challenge for NLP parsers built with machine learning techniques. Such content often includes grammatically incorrect sentences and non-standard usage of language, as well as emoticons, acronyms, strings of non-letter characters and so on. This content is constantly changing and expanding with different words or syntactic structures. All of this content has meaningful information and it is easy to understand by humans but it is still difficult for NLP applications to extract meaning out of it.

One way in which current NLP parsers can be updated or improved (for better accuracy or extracting additional information) is to modify the existing corpus, or create a new corpus or re-annotate existing one and retrain the system with it to understand new content. However, this is a tedious, costly and time-consuming process. For example all current NLP parsers are using corpus as a training data annotated by linguists with predefined tags (e.g. Penn Treebank)—especially use machine-learning algorithms.

If there was a need to distinguish the pronominal or adjectival aspect of "that" (giving them different POS tags in different context), linguists would need to manually re-annotate all the sentences in the whole corpus that contain the word "that" regarding the context of each usage of "that" and retrain the parser.

Building a particular application on top of an NLP parser requires building a module to transform the NLP parser output into usable data. The application using the parser's output could be coded in a programming language, use a rule based systems or be trained with machine learning techniques—or created with combination of any of the above methods.

Using NLP parsers can be challenging due to the need to understand the structure of the output and parameter's (requires expert knowledge). One of the challenges in NLP parsers is to provide constant consistent structure of information. Also, the output of the NLP parsers rely on the quality of the input text data.

For example,
Let's consider these sentences
1. John likes math.
2. John likes to learn.
3. John likes learning math in the evening.

By using grammar parsers in each case you will get different notations for the object that John likes.

In constituency parsers the number of levels (depth) in a parse tree depends on the length and the grammatical structure of the processed sentences. In the given example above the first sentence has 3 levels, the second sentence has 0.5 levels and the third example has 6 levels in a tree representation.

In state-of-the-art dependency parsers the structure of the output and number of levels in the dependency tree representation also vary. Adding even one word in the sentence can alter the grammatical information of all the other words.

The given example about John would produce different structure for each sentence. The first sentence require extracting dependents of "dobj" relation connected to the word "likes", in the second all dependents of "xcomp" relation connected to the word "likes" and in the third example there is a need for analyzing all governors connected to dependents of "xcomp" related to the word "likes"

All of the above is the reason why it is difficult for people and especially non-linguists (e.g., developers, analysts) to use the parser output and write rules to adjust it to their current needs. For example, to write an information extraction engine to extract information about product features from reviews you could use a constituency parser or a dependency parser but you need to write complex algorithms to search through the parse tree. To move to another domain (e.g. extracting information from twitter) the algorithms must be redesigned, and part of the code rewritten.

To deal with these problems NLP systems use machine learning techniques. This approach has some limitations in terms of accuracy and amount of extracted information.

There are query languages to process structured data (e.g. SQL for relational databases, Cypher for graph databases, SPARQL-RDF tagged texts (resource description framework)) but there are no languages designed directly to query the structure of the natural language (output of the NLP parser).

It would be desirable to have an efficient framework for storing information decoded from text. It should provide an invariant and consistent way of storing information which would be insensitive to different types of input. Having such a framework, it would be possible for non-experts to write efficient rules on top of the NLP parser's output.

It would be desirable to have a parser for natural language processing that is built fully algorithmically so it allows for constantly improvement in accuracy, and the addition of new features, without building or re-annotating any corpus. It would desirable to have an NLP system that is more capable than current NLP parsers of dealing with non-typical grammatical input, deals well with constantly-changing language on the web, and produces accurate output which can be stored into an efficient framework of information.

It would also be desirable to have a query language that can be used on the logical layer across different input contexts allowing humans to write efficient rules for extracting information, and that is capable of effectively leveraging many NLP systems.

BRIEF DESCRIPTION OF THE DRAWINGS

FIG. 1 is a block diagram of a prior art natural language processing system.

FIGS. 9-14 are diagrams of a clause divider process according to an embodiment.

FIG. 16 is a flow diagram illustrating a method of improving the accommodator or modifying the accommodator as exceptions occur according to an embodiment.

FIGS. 18-23 are diagrams illustrating the operation of an accommodator according to an embodiment.

FIG. 25 is a diagram of a three-level output structure for a Language Decoder according to an embodiment

FIGS. 28-34 illustrate a user interface of a knowledge browser application according to an embodiment.

DETAILED DESCRIPTION

Embodiments of inventions disclosed herein include improvements on current NLP systems and methods that are especially relevant to processing input that consists of plain text from different types of context. As such, the embodiments disclosed herein provide a highly accessible platform for natural language processing. The output of the disclosed NLP system is easily leveraged by various software applications to analyze large quantities of text from any source in a more sophisticated and flexible manner than previously possible.

The Language Decoder is a novel fully algorithmic NLP parser that decodes information out of text and stores it into a three-level framework which is capable of handling various type of texts from different domain like reviews, news, formal documents, tweets, comments etc.

The algorithmic nature of the system allows it to achieve high accuracy on user generated content.

Embodiments of the NLP system can thus work properly on different kinds of domains at the same time.

This three-level hierarchical framework of processed text is leveraged by embodiments of a language decoder query language LDQL as further described herein. The LDQL is particularly easy to use for developers, without requiring specific linguistics training. However, other rule-based query languages could conceivably be developed for extraction (by query) of information from text processed by the LD.

Figure 2:
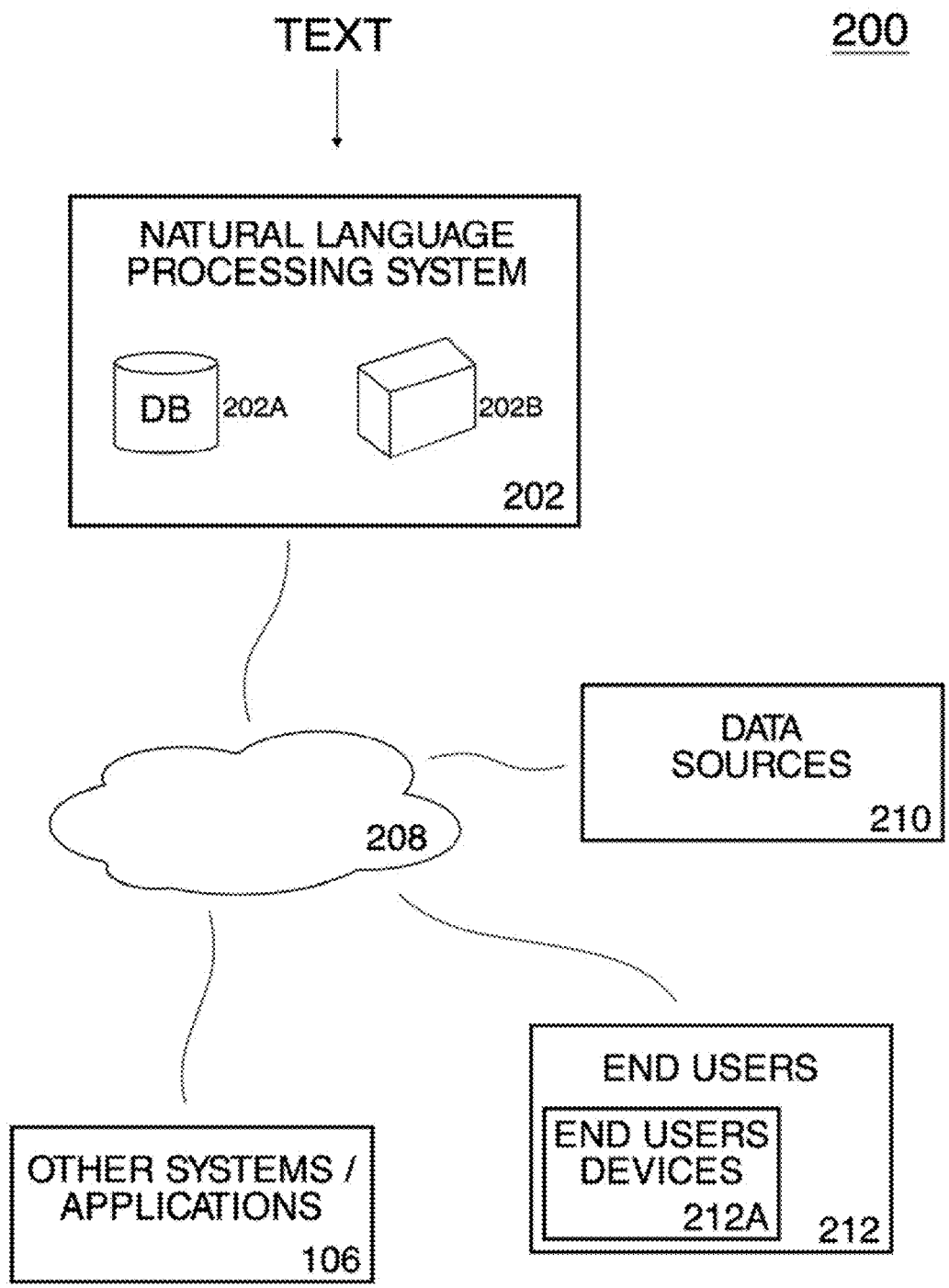
FIG. 2 is a block diagram of a natural language processing environment according to an embodiment.

FIG. 2 is a block diagram of a natural language processing environment 200 according to an embodiment. A natural language processing (NLP) system 200 accepts text as input. Text can include electronic data from many sources, such as the Internet, physical media (e.g. hard disc), a network connected database, etc. The NLP system 200 includes multiple databases 202A and multiple processors 202B. Databases 202A and processors 202B can be located anywhere that is accessible to a connected network 208, which is typically the Internet. Databases 202A and processors 202B can also be distributed geographically in the known manner. Data sources 210 include: 1) any source of electronic data that could serve as a source of text input to NLP system 202, and 2) any source of electronic data that could be searched using the output of NLP system, 202 as described further below.

Other systems and applications 106 are systems, including commercial systems and associated software applications that have the capability to access and use the output of the NLP system 202 through one or more application programming interface (APIs) as further described below. For example, other systems/applications 106 can include an online application offering its users a search engine for answering specific queries. End users 212 includes individuals who might use applications 106 through one or more of end user devices 121A. User devices 212A include without limitation personal computers, smart phones, tablet computers, and so on. In some embodiments, end users 121 access NLP system 202 directly through one or more APIs presented by NLP system 202.

Figure 3:
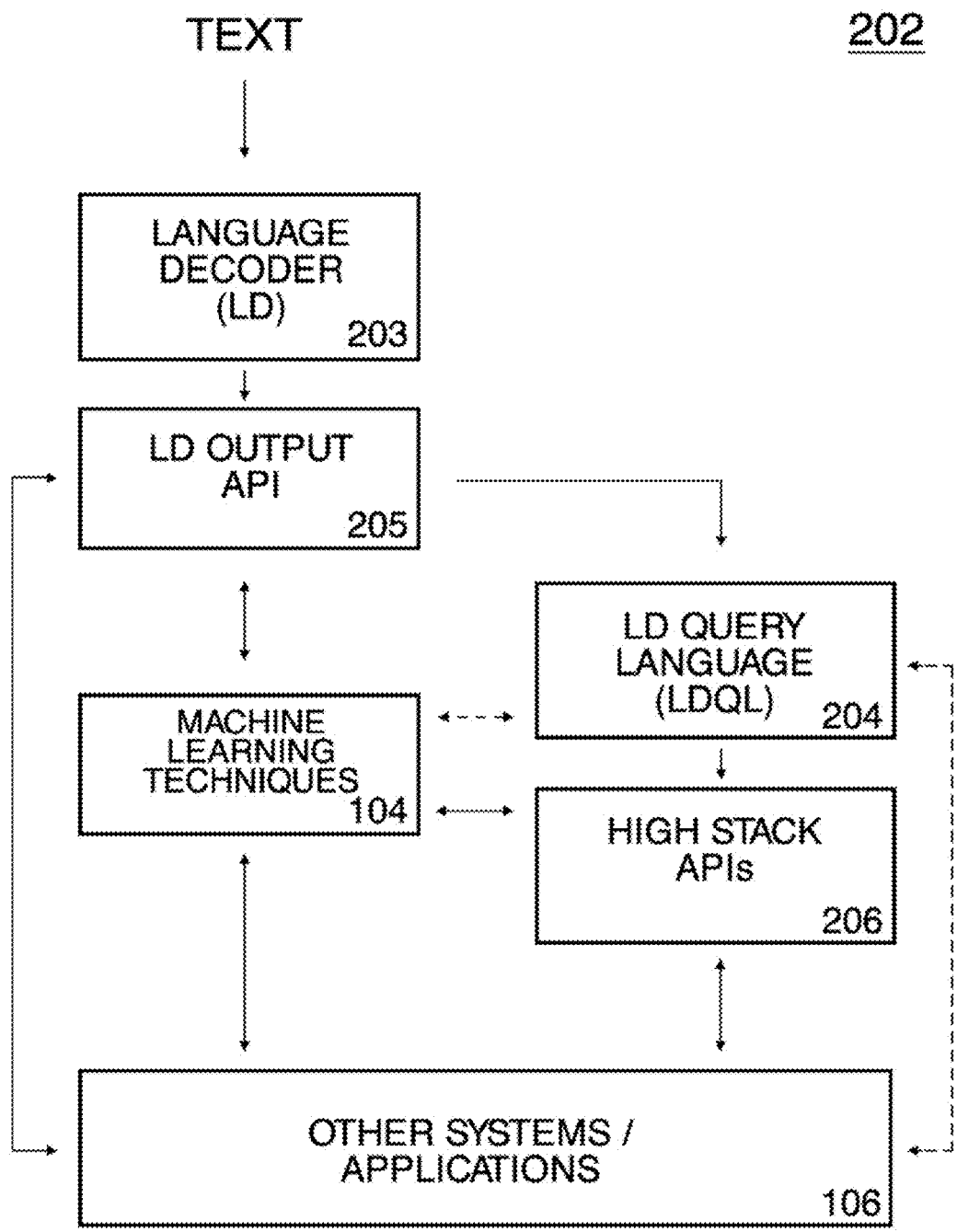
FIG. 3 is a block diagram of a natural language processing system according to an embodiment.

FIG. 3 is a block diagram illustrating NLP 202 in more detail according to an embodiment. Input text is received by Language Decoder (LD) 203. LD 203 parses and tags (among other things) the input text as further described below. The output of the LD 203 is referred to here as LD output API 205, and can be operated on by a variety of downstream software applications or systems as described in this document. The format of LD output 205 is described in further detail below, but it is easily accessible to various machine learning system 104, which can process it to provide input to yet other systems/applications 106. Other systems/applications 106 can also directly use LD output 205. Once the format of LD output 205 is understood, anyone can access desired information from the original input text.

The LD output 205 can also be operated on by embodiments of an LD query language (LDQL) 204. LDQL 204 is described according to various embodiments below as an improved query language designed to take advantage of LD output 205. However LDQL 204 can also operate on the output of any prior NLP system. Also provided in various embodiments is a higher level of APIs (as compared to LD output 205) 206 for providing machine learning systems 104 and other systems/applications 106 more intuitive access to LD output 205. Other systems/applications 106 can include semantic databases, Freebase™, Wordnet™, etc.

In general, LD high stack APIs 206 are relatively easy to use to for other systems seeking to manipulate LD output 205. However, machine learning systems 104 and other systems/applications 106 can also directly write queries using LDQL 204.

Figure 4:
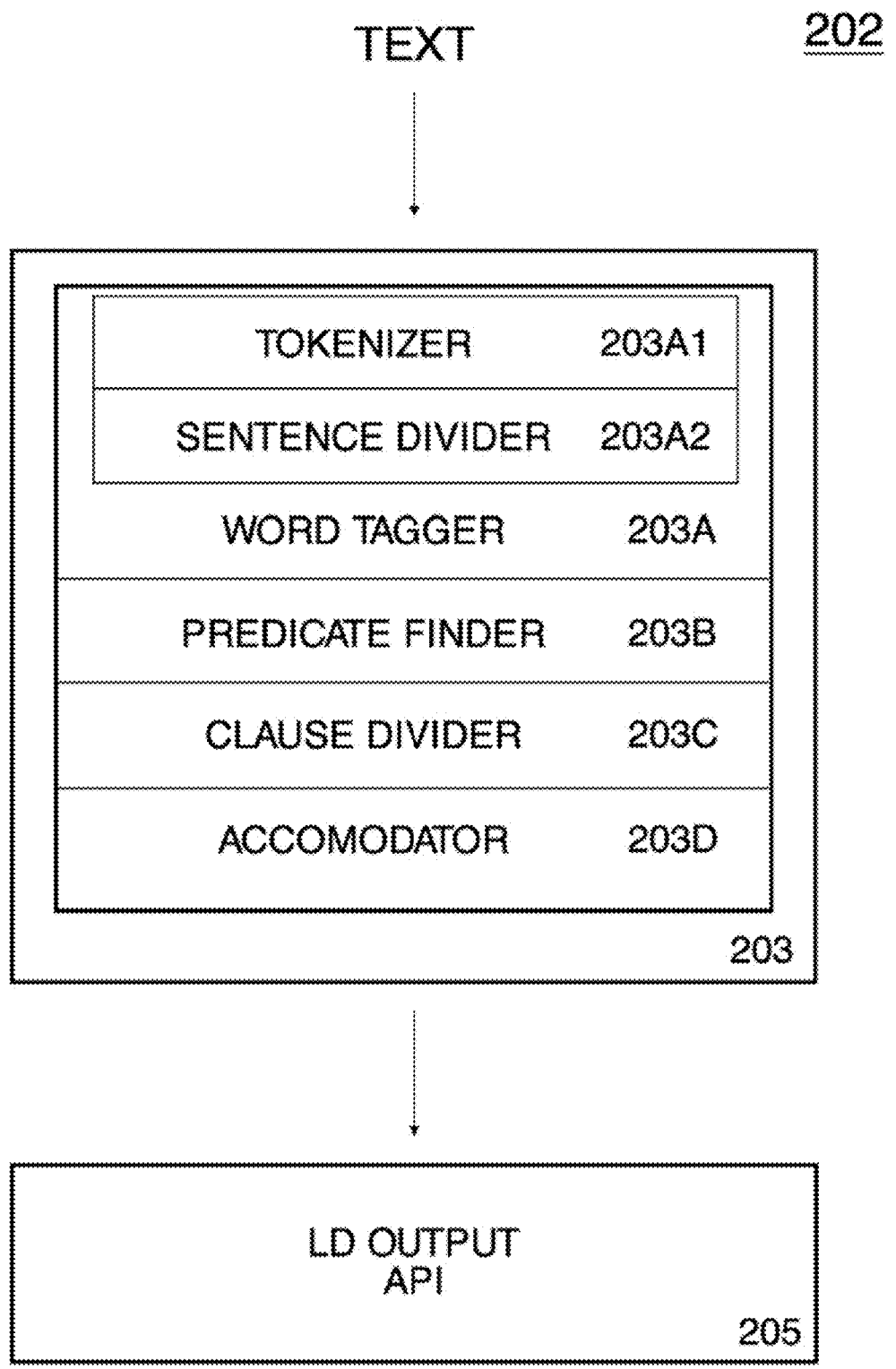
FIG. 4 is a block diagram of a natural language processing system according to an embodiment.

FIG. 4 is block diagram showing more detail of an NLP system 202 according to an embodiment. The LD 203 includes a word tagger 203A which is further described below. The word tagger 203 includes a tokenize 203A1, and a sentence divider 203A2. The word tagger 203A communicates its output to a predicate finder 203B. The LD 203 also includes a clause divider 203C and an accommodator 203D.

Word Tagger Methodology

Contrary to all prior-art word taggers, present word tagger does not use any machine learning techniques and contains only human-written disambiguation rules.

Word tagger rules are described by a language resembling well-known regular expressions, which is comprehensible and easy to change for human operators. Hence, the process of making changes is relatively fast, especially in comparison to the prior-art machine learning based algorithms.

A set of rules is divided into two groups (referred to herein as "exact group" and "inexact group") along with different usages within the tagging algorithm.

Contrary to machine learning approaches, the present word tagger uses its own dictionary to recognize words and assign all possible tags to them. It is proven that word taggers using machine learning techniques achieves higher accuracy for tagging known tokens (words) than unknown. The term "known token" means that token appeared in the training corpus at least once. Differential in accuracy for known and unknown tokens is about 7-8% for good parsers (see for example http://nlp.stanford.edu/pubs/CICLing2011-manning-tagging.pdf) Embodiments of the present word tagger allow new words to be added directly to the referenced dictionary with all possible tags. For example, "google" can be added with tags related to noun as well as verb. The present word tagger contains rules responsible for resolving that kind of ambiguity, so it can automatically handle that problem.

Word Tagger Output

The present word tagger provides a unique tagset.

Differences between the present tagset and prior-art tagsets:

The present tagset does not exclude particles as a separate tag. The definition of particle is very inconsistent. Therefore, a distinction for adverbs and prepositions is preferred.

The present tagset provides distinction for prepositions and subordinating conjunctions.

For determiners, the present tagset provides distinction for adjectival and pronominal function.

For pronouns, the present tagset provides distinction for relative and interrogative function.

The Process of the Word Tagger

Figure 5:
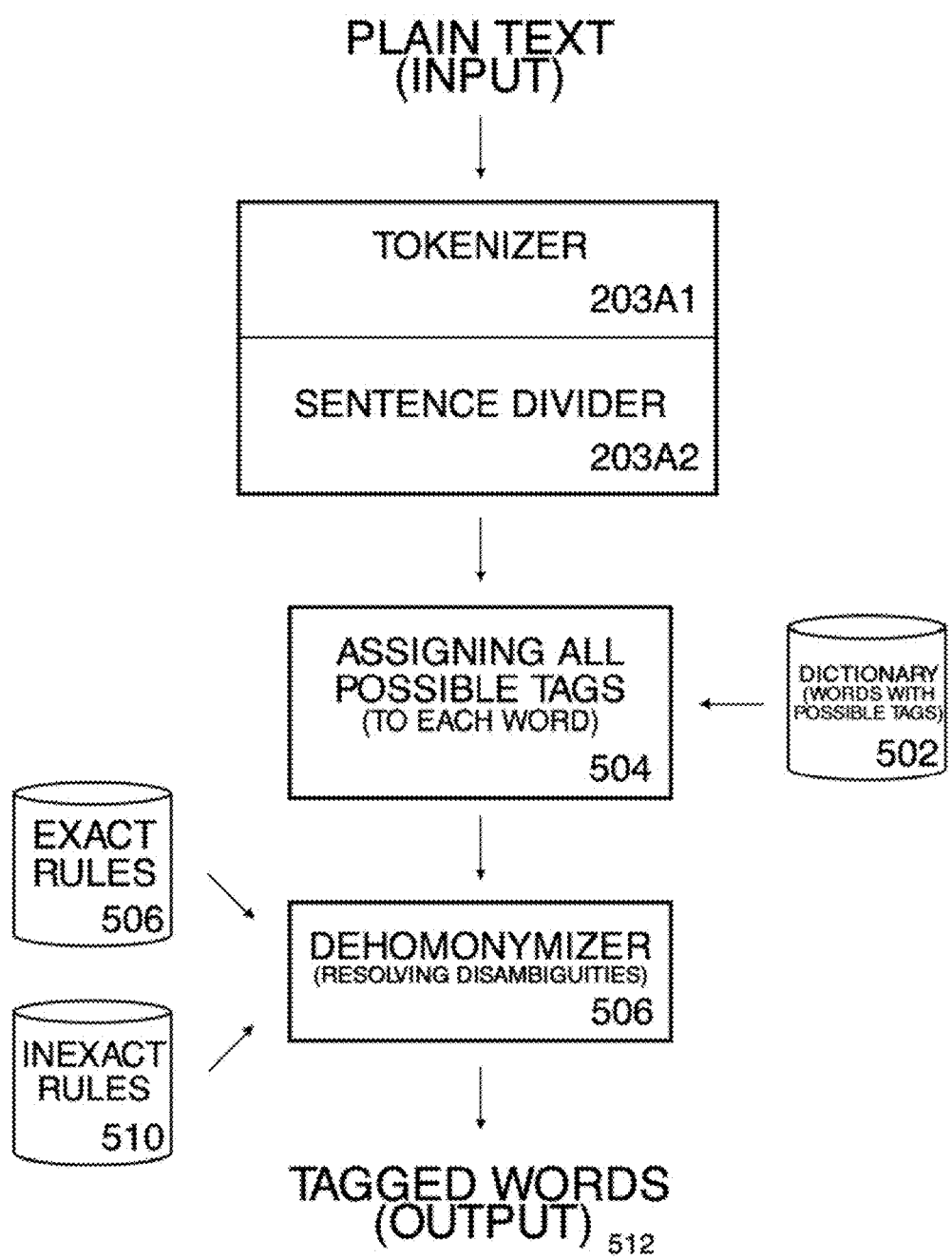
FIG. 5 is a block diagram of word tagger according to an embodiment.

The input to the word tagger 203 consists of plain text. The text can come from any source such as an article, a document, user generated content and any other source. Referring to FIG. 5, a word tagging process according to an embodiment is illustrated. In an embodiment, the input to the word tagger element 203A is text that is tokenized into sentences and words by preceding elements tokenize 203A1 and sentence divider 203A2. A dictionary 502 is accessed to find words with possible tags. All possible tags are assigned to each word (504). The words assigned with all possible tags are input to a dehomonymizer 506 which resolves ambiguities (i.e. situations in which for one word there is more than one possible matching tag). The dehomonymizer 506 operates using exact rules 508 and inexact rules 510 as further described below. After ambiguities (if any) are resolved, tagged text 512 is output by the word tagger 203A. The word tagger output consists of text tokenized into sentences and words, each of which has assigned exactly one tag.

Exact rules 508 and inexact rules 510 are two groups of rules. Each rule examines the context of a word with an ambiguous tag (that is, more than one possible tag). Such context is not limited or restricted; it can address any element of the text, in both directions at the same time. This is a range aspect of the claimed invention describing the facility to access or examine any element of the text before or after an ambiguous element, without limit.

Another aspect of the word tagger 203A is the manner of expression employed. In order to examine the context of a word, rules permit the creation of patterns and sub-patterns which address words and/or their tags and which can be subject to following operations:

conditionality (for single element or subpattern) (corresponding to "?" regular expression operator), alternatives (for single element or subpattern) (corresponding to "|" regular expression operator), repetition (for single element or subpattern) (corresponding to "+" and "*" regular expression operator), negation (for single element or subpattern) (corresponding to "!" regular expression operator).

This form of rules expands their expressiveness in comparison to prior static look-ups and ranges ("next word is . . . ", "there is a . . . word in range of 3 words before" etc.) This in effect allows better description of situations in which a given rule should apply.

In an embodiment, the rules are applied separately for each sentence according to following algorithm:

1 Stop algorithm at any point when there is no ambiguity left in current sentence.

2. For all ambiguous words try to apply all exact rules in proper order.

3 Apply inexact rules until any is met. Go to step 2.

Methodology of Improving the Word Tagger and Resolving Exceptions

Figure 6:
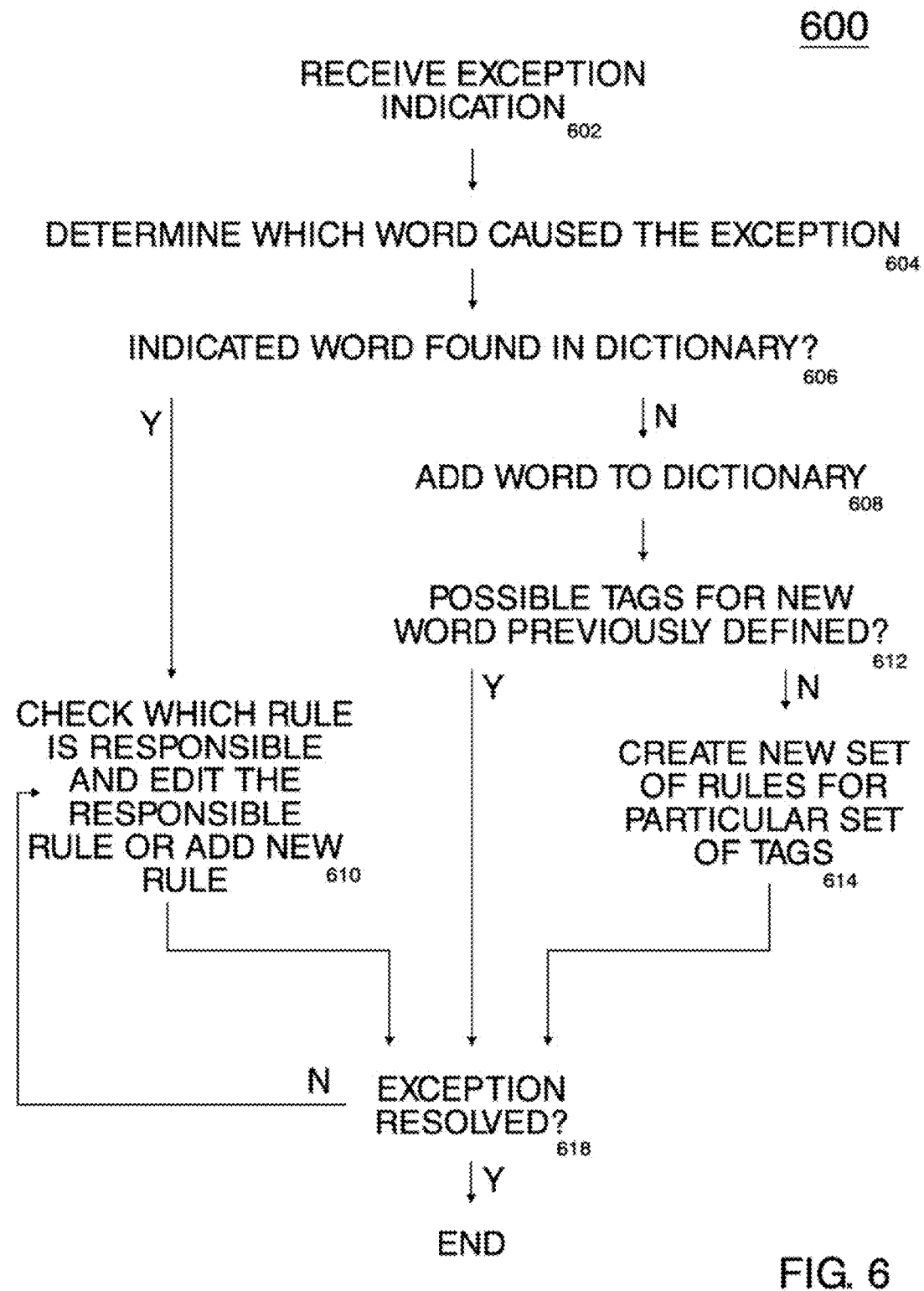
FIG. 6 is a flow diagram of a word tagger updating or exception handling method according to an embodiment.

FIG. 6 is a flow diagram illustrating a method 600 of improving the word tagger or modifying the word tagger as exceptions occur according to an embodiment, Exceptions include failure of the word tagger to tag an element of input text.

At 602 an exception indication is received within the system 202. It is determined which word caused the exception (604). The indicated word is searched for in the dictionary 502 (606). If the word is not in the dictionary, it is added to the dictionary at 608. Then it is determines (612) whether possible tags for the newly word have been previously defined. If no tags were previously defined, a new set of rules is created for a new set of tags is created at 614. Then if the exception is resolved at 618, the process ends. If the exception is not resolved, a check is performed to find which rule was responsible for the exception (610). The responsible rule is edited, or a new rule is added (610). If at 612 possible tags for the newly added word have been previously defined, the process continues to 618.

If, after checking 606, the word is in the dictionary, it is determined which rule is responsible for the exception, and the responsible rule is edited or a new rule is added 610. In an embodiment, the editing is performed by a person. In another embodiment, the editing is performed by a machine according to a separate rule-making algorithm.

The above methodology of resolving exceptions to the system may become an automated process.

Clause Divider Methodology

Referring to FIG. 4, the LD 203 includes a predicate finder 203B and a clause divider 203C. The output of the word tagger 203A is received by the predicate finder 203B. Predicate is understood here as a function over arguments, i.e. it consists of a main verb grouped with other verb components like modals, auxiliaries, negations and particles, contrary to the traditional approach where predicate also contains other sentence elements like objects, predicative expressions and adjuncts. Predicate finder 203B can include any of the known predicate finder methods. The output of the predicate finder 203B is received by the clause divider 203C which performs a clause divider methodology according to embodiments.

Embodiments of the clause divider 203C execute an algorithm emulating human reasoning behind dividing text into clauses. To this end, a sequential approach is employed rather than applying patterns to an entire sentence. In effect, collections of one or more words (scraps) are sequentially considered (which is similar to what a human actually does while hearing or reading a sentence) and an attempt is made to assign each scrap to build a clause "on the fly" constantly trying and rejecting different alternatives. This approach simplifies aspects of language decoding, such as handling of nested relative clauses and facilitates the creation of simpler and more accurate rules than those based on patterns.

Output of the Clause Divider

According to embodiments, the clause divider provides division for clauses. Clauses can possess at the most one predicate (either finite or non-finite like infinitives, participles and gerunds) and all of its arguments. The LD provides connections between clauses based on criteria concerning their function towards their superiors. Clauses can be connected directly or through nodes. Nodes are sentence elements provided to connecting clauses, e.g. coordinating or subordinating conjunctions. The LD provides unique classifications of clauses which correspond to the LD system 202 classification of phrases. Main clauses are distinguished. Other clauses can function as subjects, objects, complements and attributes, and therefore those can be labeled with a proper function name (e.g. attribute clause).

In an embodiment, the clause divider includes at least the following characteristics.

With reference to one of the current, typical dependency parsers:
1. Embodiments provide implicit division into clauses. In referenced parser, derivation from the relations structure is required.
2. Coordinating nodes (elements connecting two coordinated clauses (e.g. "and", "but", "of") are distinguished by embodiments. Referenced parser does not provide a distinction between a relation connecting two coordinated clauses and a relation connecting two coordinated phrases or words. In addition, elements connecting a subordinated clause to its superior clause (e.g. "which", "after", "when") are distinguished by embodiments. In typical dependency parser the main connection holds between two verbs representing the clauses, hence the equivalent of a subordinate node has to be connected with a proper verb.
3. In the clause divider 203C, classification is based on different criteria (than in the typical dependency parser) and in consequence not every type from one classification is equivalent to a subset of the types of the other classification (although in a number of situations it is).
4. Types of clauses in the LD 202 are equivalent to types of phrases, making the LD system 202 more coherent in comparison to the typical parser. For example, some of referenced parser's relations corresponding to clause types are common with those for phrases and/or words.

With reference to one of the current, typical constituency parsers.
1. Typical constituency parser provides classification that is based on criteria concerning grammatical construction. This is in sharp contrast to the clause divider 203C, whose criteria is based on a clause's function towards its superior. In effect every type from one classification can match almost any type from the other, depending on the particular situation.
2. The LD 202 treats nodes connecting clauses (e.g. "and", "but", "which", "after") as separate elements on a clause level, whereas the referenced parser includes them into the following clause.

The Process of the Clause Divider

Figure 7:
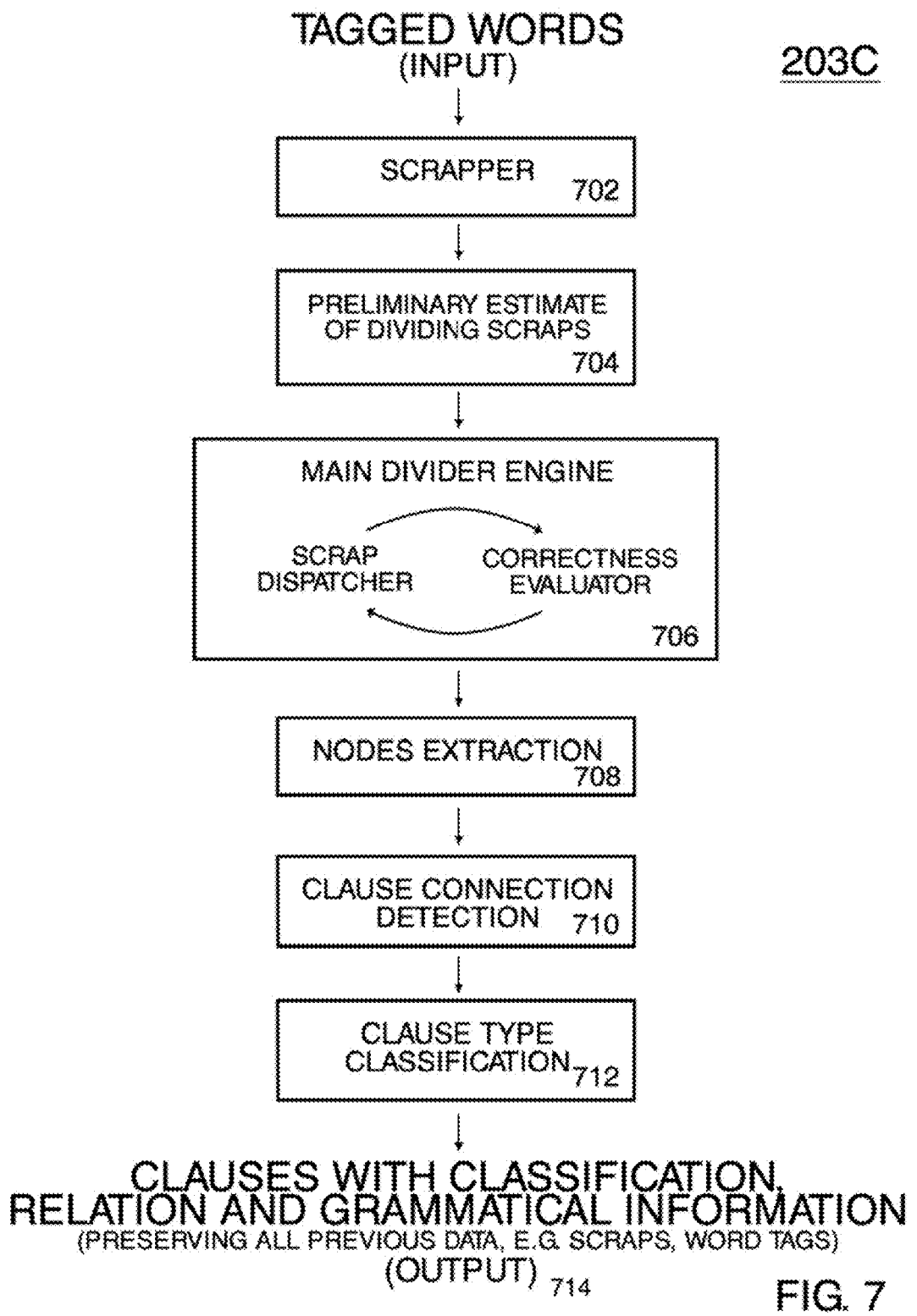
FIG. 7 is a block diagram of clause divider elements and processes according to an embodiment.

FIG. 7 is a diagram showing elements of a clause divider 203C and various tasks performed by the clause divider 203C. Generally, the clause divider input is text divided into sentences and tokenized into words, along with their tags as assigned by word tagger 203A. Grammatical information for each sentence is provided by predicate finder 203B. The tagged word input is received by a scrapper element or module 702. The scrapper 702 groups the tagged words into scraps, which are groups of one or more words that are strictly connected, but do not necessarily from a phrase.

More precisely, a scrap is a maximal set of words that will certainly form a phrase either by itself or along with some other scrap(s). That is, if two elements are able to form two separate phrases, but this is not evident at the point of creating scraps, they become separate scraps. There is an exception to the foregoing. Specifically, prepositions are joined in scraps with following noun phrases in principle, despite the fact that they will later be divided into two separate phrases.

At 704, the clause divider 203C makes a preliminary estimate of which scraps are the strongest candidates to introduce a new clause (that is, which scraps are responsible for dividing the sentence into clauses. The output of the preliminary estimate process 704 is received by a main divider engine 706, which includes a scrap dispatcher and a correctness evaluator. The scrap dispatcher assigns scraps to appropriate clauses. In an embodiment, this assignment is based on constant interaction between the scrap dispatcher and the correctness evaluator. The correctness evaluator evaluates the decision made by the scrap dispatcher by determining whether the decision generated a correct clause or not. The output of the main divider engine 706 is received by a nodes extraction process 708. This process extracts nodes as separate elements on a clause level. Relationships between clauses are established by a clause connection detection process 710. Clause types are detected (e.g. subject, object, complement) by a clause type classification process 712. The output 714 of the clause divider is text divided into sentences and clauses, which contain words (along with their tags from the word tagger) grouped into scraps. The grouping serves only as an aid in prior and subsequent processes and is not itself a crucial element of the output. The words can also be considered as assigned directly to clauses. Moreover each clause has its proper grammatical information assigned, along with type and connection to its superior clause.

Figure 8:
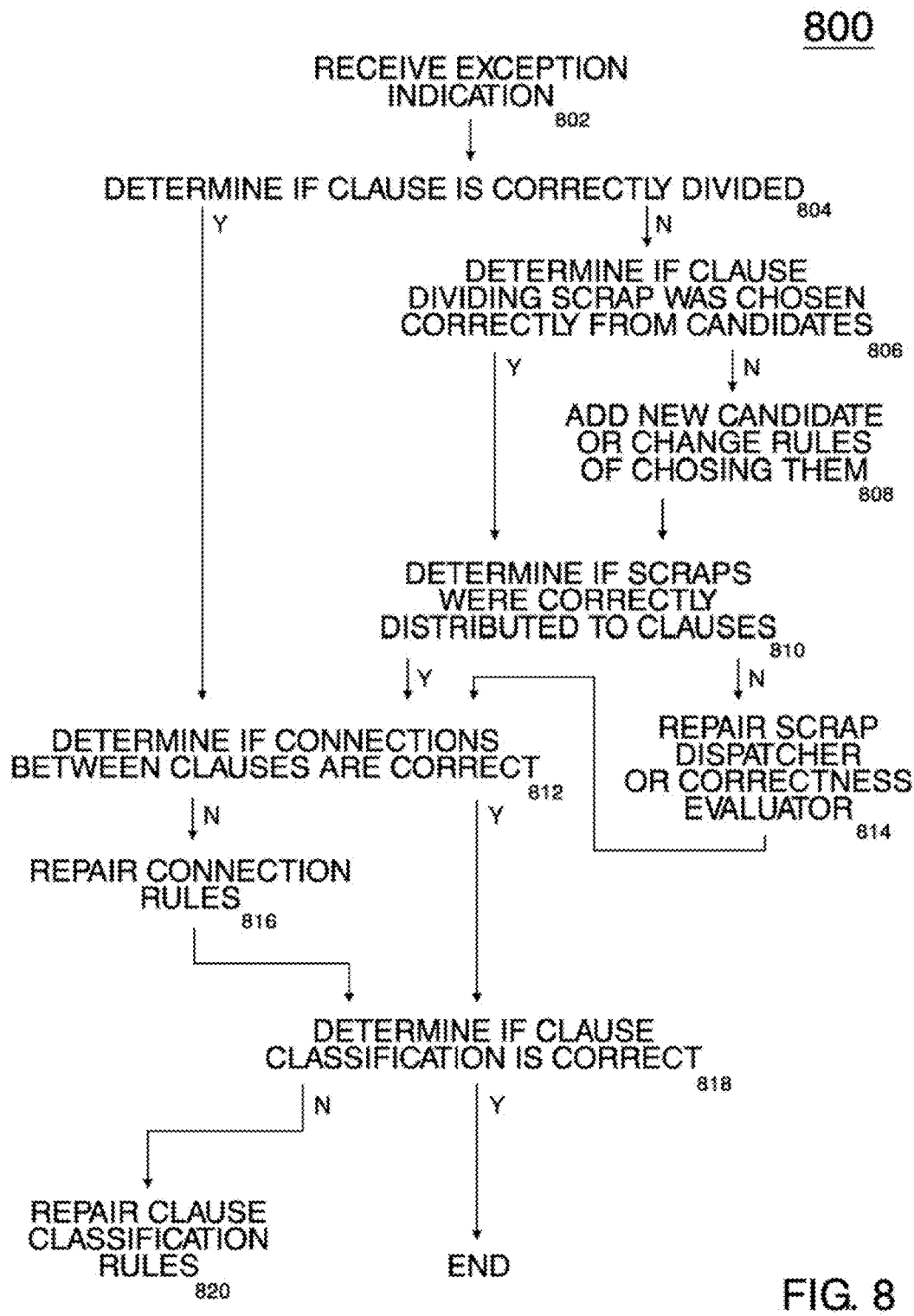
FIG. 8 is a flow diagram of a clause divider updating or exception handling method according to an embodiment.

FIG. 8 is a flow diagram illustrating a method 800 of improving the clause divider or modifying the clause divider as exceptions occur according to an embodiment. Exceptions include failure of the clause divider to divide clauses or determine the proper type or connection of the clauses.

At 802 an exception indication is received within the system 202. It is determined if the clause is correctly divided (804). If not, it is determined if the clause dividing scrap was chosen correctly from among candidates scraps (806). If not, a new candidate is added or the rules responsible for choice are changed (808).

After the changes (808), or if it was determined that the dividing scraps were chosen (806) correctly, it is determined whether scraps were correctly distributed (810) to clauses. If not, scrap dispatcher or correctness evaluator rules are adjusted (814).

After any changes are made to the scrap dispatcher rules or correctness evaluator rules (814), or if it was earlier determined that either scraps were correctly distributed to clauses (810), it is determined (812) whether connections between clauses are correct. If not, the rules governing connection determination are adjusted (816).

After adjusting the determination rules (816) or if the connections between clauses were determined (812) as correct, it is determined at 818 whether the clause classification is correct. If the clause classification is correct, the process ends. Otherwise the clause classification rules are adjusted (820).

The above methodology of resolving exceptions to the system may become an automated process.

Figure 10:
Figure 11:
Figure 12:
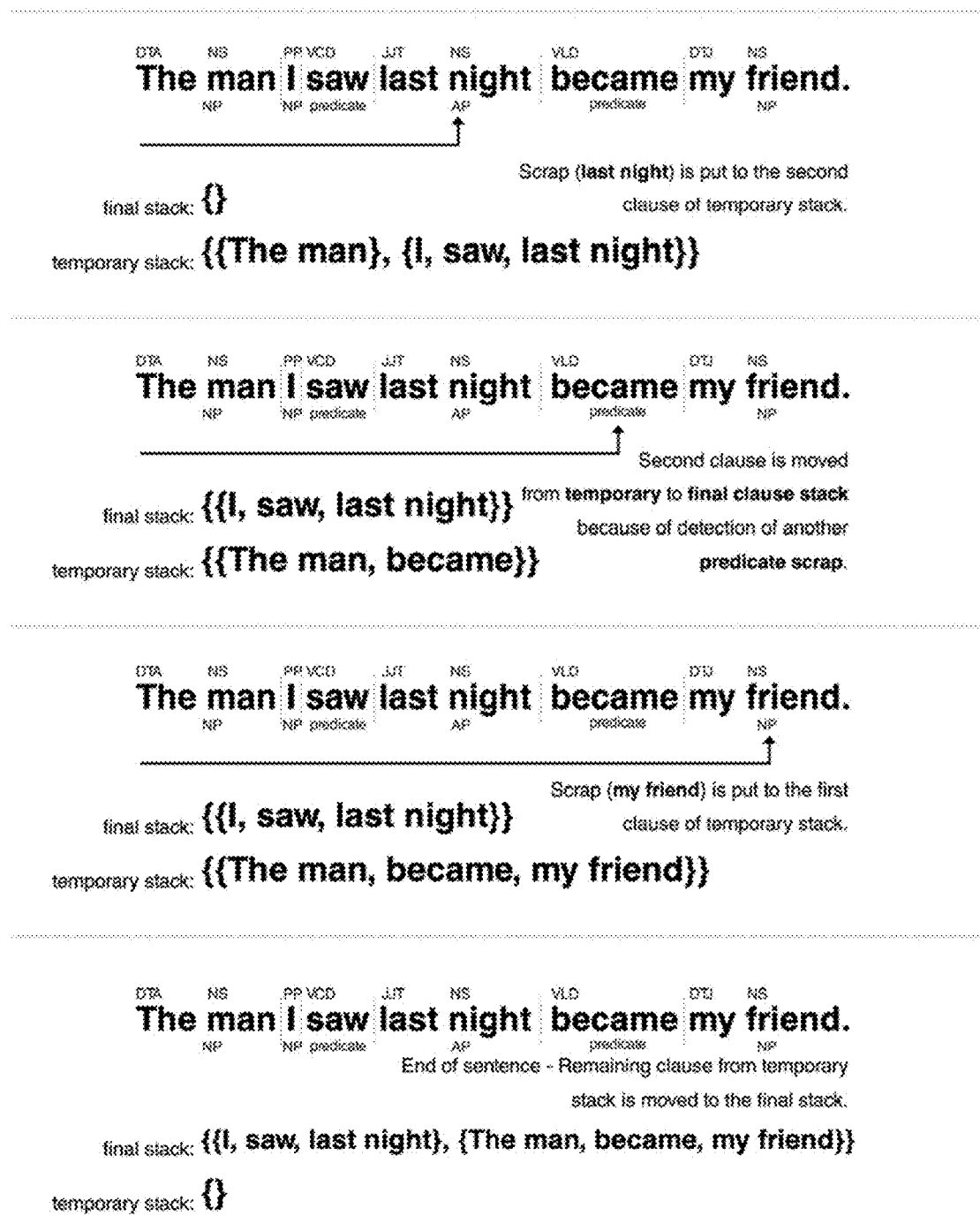

FIGS. 9-14 are diagrams illustrating a process of the clause divider 203C module according to an embodiment. Referring to FIG. 9, the input to the clause divider module 203C is the sentence "The man I saw last night became my friend." with all words tokenized and tagged by the Word Tagger 203A module and with predicates grouped and distinguished by the Predicate Finder 203B module, Scrapper 702 groups words into scraps. For example, determiners are joined with nouns, hence "the man" becomes one scrap (analogous to "my friend"). Referring to FIG. 10, the preliminary estimation of dividing scraps 704 begins from the last word of a sentence. The predicate "became" is found and added to the predicate stack, analogous to the next predicate "saw". The introduction of dependent clause is detected and therefore predicate "saw" is removed from the top of predicate stack. The first word is reached and the preliminary estimation ends. Referring to FIG. 11 the main divider engine 706 sequentially tries to assign scraps to clauses. The first scrap "the man" is assigned to the first clause of temporary stack by default. The second scrap "I" is assigned to the second clause of temporary stack, because the introduction of a dependent clause was detected between the first two scraps. Scrap "saw" is assigned to the second clause of the temporary stack. Referring to FIG. 12 the main divider engine 706 assigns the scrap "last night" to the second clause of temporary stack. Once the scrap "became" is reached, the clause from the top of the temporary stack is considered as closed, because "became" is a predicate scrap and the clause already possesses a predicate scrap "saw". Hence the clause is moved to the final stack and "became" is added to the top clause of the temporary stack. The scrap "my friend" is added to the top clause of the temporary stack. Because all of the scraps were processed, all clauses from the temporary stack are moved to the final stack and the process of assigning scraps ends.

Referring to the FIG. 13 nodes are extracted. In the considered example there are no scraps that function as nodes, hence the process leaves the clause unaltered. Afterwards the connections of clauses are detected. Because the clause "I saw last night" is interjected right after NP scrap, we consider it a dependent clause and hence determine a connection from it to "The man became my friend" clause. Moreover in this situation, a connection between the clause "I saw last night" and the phrase "The man" is established. The clause connection detection 701 then ends.

Referring to FIG. 14 the clause "The man became my friend" has no connection to a superior clause hence it obtains the type "main". The clause "I saw last night" is connected to the superior clause and to the superior phrase as well, thus it obtains the type "complement". The process of the Clause Divider 203C ends and returns output composed of the sentence "The man I saw last night became my friend" which contains two clauses "The man became my friend" and "I saw last night" along with their types, connections and respective scraps.

Methodology of Improving the Clause Divider 203C and Resolving Exceptions

By analyzing cases of wrong divisions, connections and types if clauses or adjusting the clause divider 203C into different type of content one can decide whether to:
- add or modify new divider candidates.
- add or modify rules in choosing possible alternative divisions.
- add or modify rules in correctness evaluation.

This provides flexibility and continuous improvement for different types of input context.

Accomodator Methodology

Figure 15:
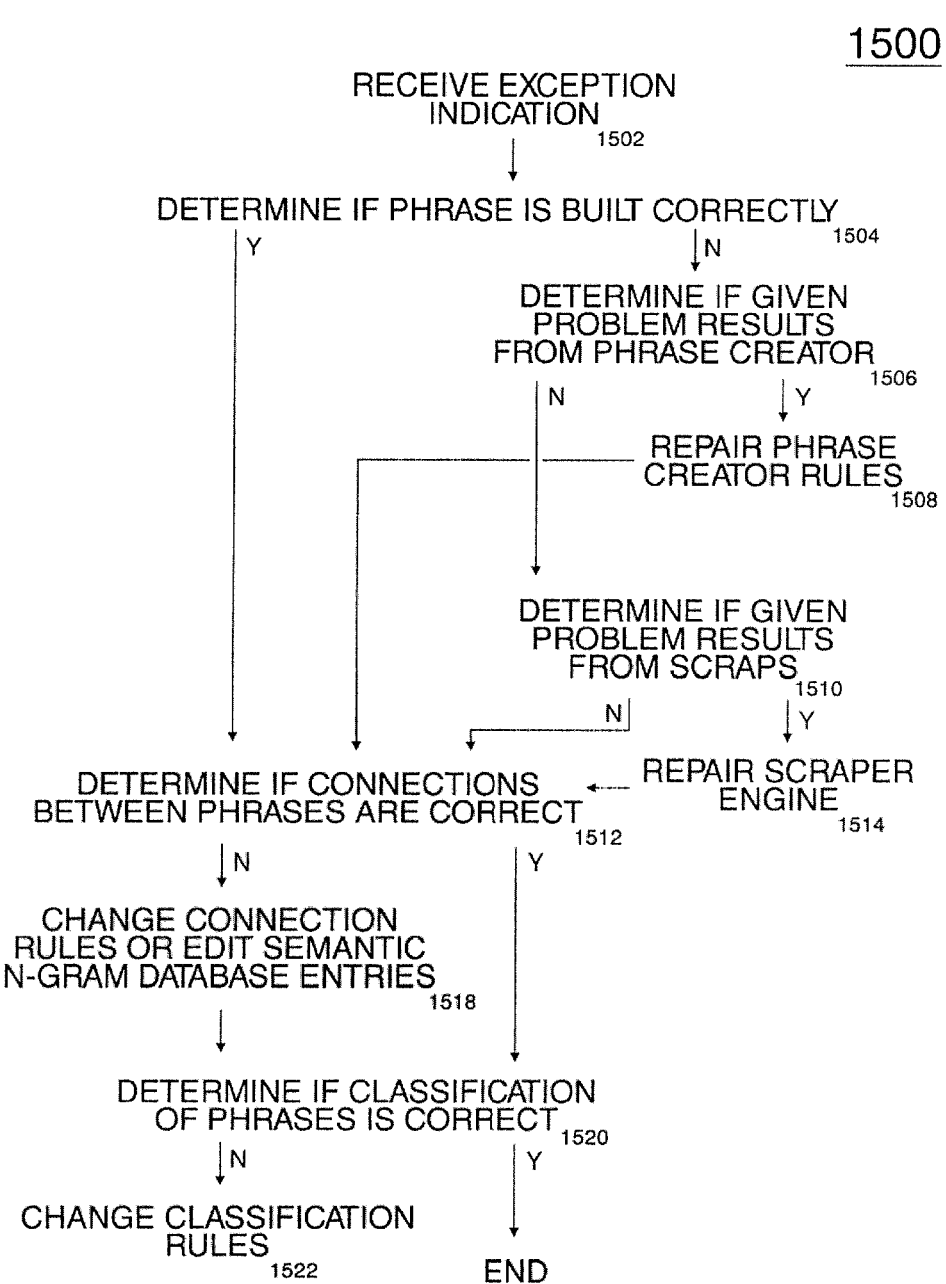
FIG. 15 is a block diagram of an accommodator according to an embodiment.

Referring briefly to FIG. 4, the output of clause divider 203C is received by an accommodator module 203D. FIG. 15 is a block diagram of an accommodator module 203D architecture according to an embodiment. In an embodiment, the accommodator 203D uses a set of types of phrases (corresponding to simple grammatical types such as predicate, subject, object, complement etc). The accommodator employs a sequential algorithm, which in one embodiment is based on hand-written rules, but embodiments are not so limited, Maintaining control over rules and having the ability to modify and add rules to the system at will enables the LD 203 to work properly on different kinds of domains (or language contexts) at the same time. This tight control over rules and the adaptability of the rules also provides the ability to handle new domains while avoiding any distortion in the original or prior domain(s). A separate semantic database is referenced to resolve ambiguities with connections (e.g., a semantic n-gram database 1603). In addition, the accommodator 203D module uses a method for determining connections between phrases (the "it" test described below with reference to FIG. 17).

The accommodator 203D receives words grouped into scraps and further into clauses (along with connections and types). In other embodiments the accommodator is based on words grouped directly into clauses. A phrase creator module 1602 detects boundaries of every phrase. Then a phrase connection detection module 1604 detects connections between phrases relying on a semantic n-gram database 1603. A phrase type classification module 1606 denotes types for each phrase in every clause in a sentence. Then a word component classification module 1608 assigns components to each word within all of the phrases. Finally, a word connection detection module 1610 detects connections between each word within a phrase.

The accommodator 203D output 1612 consists of words grouped into phrases, which are further grouped into clauses. The phrases and words have proper connections and types assigned. In an embodiment the accommodator 203D output is the final output of the LD system 203, or LD output API 205 as shown in FIG. 4. As further described in other parts of this document, the output is useable by many other systems via APIs or other programming tools or interfaces. In an embodiment, types of the phrases are determined after the connections, they are evaluated on the basis of the contained words (along with their tags), types of the scraps from which a phrase comes, and types of scraps from which connected phrases come. Although it has proved efficient and accurate to first connect the phrases and classify them afterward, it is just as viable to do it the other way around.

An advantage of the accommodator over prior modules that perform analogous tasks is that the accommodator 203D method determines connections between phrases and their grammatical functions in way that is similar to the way in which a human processes language. The accommodator 203D sequentially considers separate scraps, and chooses, for a set of syntactic possibilities, the one that semantically makes most sense. In an embodiment this is achieved in part though using a database 1603 containing n-grams (representing these syntactic possibilities) along with the quantity of their occurrence in a large corpus. Ambiguities in interpretation are always reduced to a set of syntactic possibilities consisting of a few elements and are then solved on a semantic basis. The result is simple and intuitive for a human to understand. Thus, a human can readily see and understand the decisions the LD 203 makes and, when appropriate, correct its mistakes by modifying rules so that the system is continually improved.

Methodology of Improving Accommodator and Resolving Exceptions

FIG. 16 is a flow diagram illustrating a method 1500 of improving the accommodator or modifying the accommodator as exceptions occur according to an embodiment. Exceptions include wrong detection of phrase boundaries or failure of determining type of phrase or its connection.

At 1502 an exception indication is received within the system 202. It is determined if the phrase is built correctly (1504). If not, it is determined if the problem results from the phrase creator (1506). If so, the rules of creating phrases are adjusted (1508). If it was determined that the wrongly built phrase did not result from phrase creator (1506), it is then determined whether it is a result of scraps (1510). If so, the scrapper engine is repaired (1514). Once the scrapper engine was repaired (1514), it is determined whether the connections between phrases are correct (1512). If these connections are correct, it is determined whether the classification of phrases is correct (1520). If the classification of phrases is correct, the process ends. If the classification of phrases is not correct, the classification rules are changed (1522).

Returning again to 1504, if the phrase is built correctly, it is determined whether connections between phrases are correct (1512). The determination of 1512 is also resorted to when the exception is determined not to result from scraps (1510), and when the phrase creator rules have been corrected (1508). If at 1512 connections between phrases are correct, the process proceeds to 1520. If at 1512, connections between phrases are not correct, connections rules are changed, or the n-gram semantic databased entries are edited (1518). Next, it is determined whether the classification of phrases is correct (1520). If the classification of phrases is not correct, the classification rules are changed (1522).

If the rules of creating phrases were adjusted (1508) or if it was determined that the problem does not result from scraps (1510) or that the phrase was built correctly (1504), it is determined if the connections of the phrases are correct (1512). If no, the connection rules are changed or the semantic n-gram database is edited (1518). After these changes (1518) or if the connection between phrases is determined as correct (1512), it is determined if the type of the phrase is correct (1520). If so, the process ends. Otherwise the rules for determining type of phrase are adjusted (1522).

The above methodology of resolving exceptions to the system may become an automated process.

Figure 17:
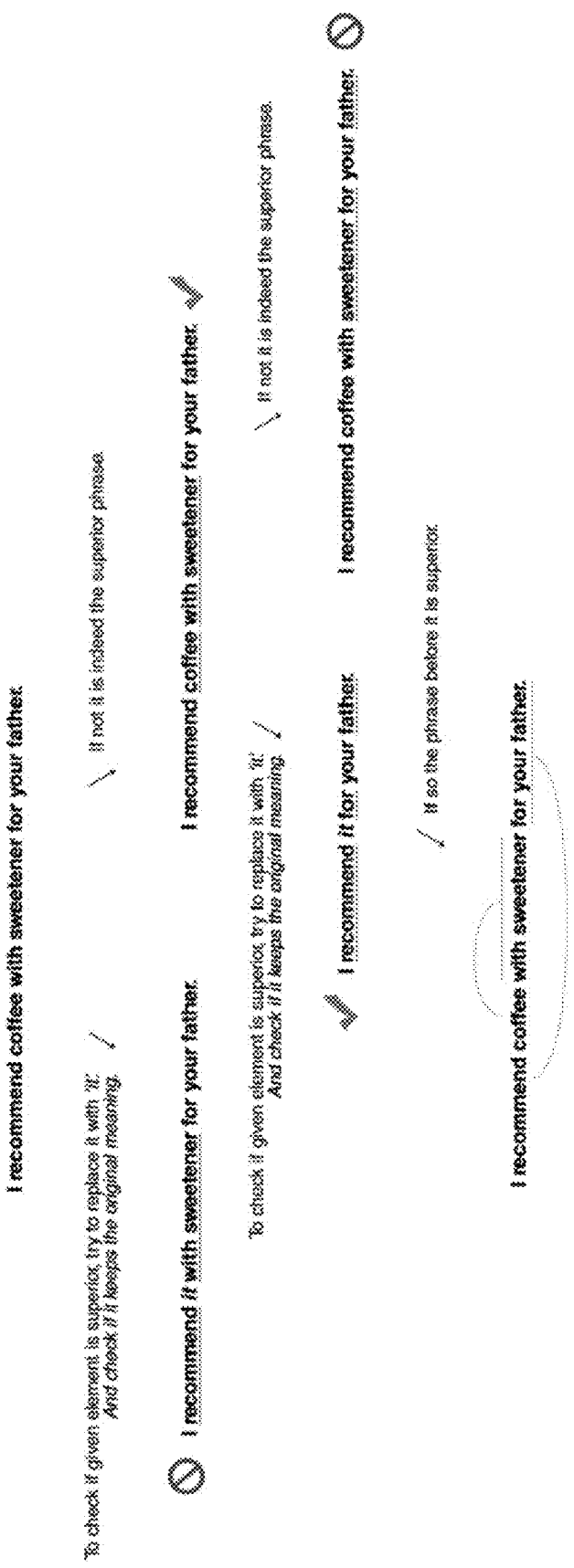
FIG. 17 is a flow diagram of the "it" test according to an embodiment.

The accommodator employs an unambiguous criterion for determining connections between phrases, which causes its performance to be reliable and its output to be easily understood by humans. This allows the output of the LD 203 to be more readily incorporated into other existing language applications and their respective rules. As an example, to determine the connection between certain prepositional phrases, the accommodator employs the so-called "it" test, which is illustrated in FIG. 17. An "it" algorithm according to an embodiment is based on an implementation of the "it" test aided by the semantic n-gram database 1603. Referring to the example of FIG. 17, consider the sentence (consisting of one clause) "I recommend coffee with sweetener for your father." To determine if a given clause element is superior, it is replaced with "it". If the original meaning of the sentence is not preserved, the replaced element is indeed the superior element. Otherwise, the replaced element is not the superior element. As shown, for this clause, it is determined that "coffee" is a superior phrase to prepositional phrase "with sweetener"

Figure 20:
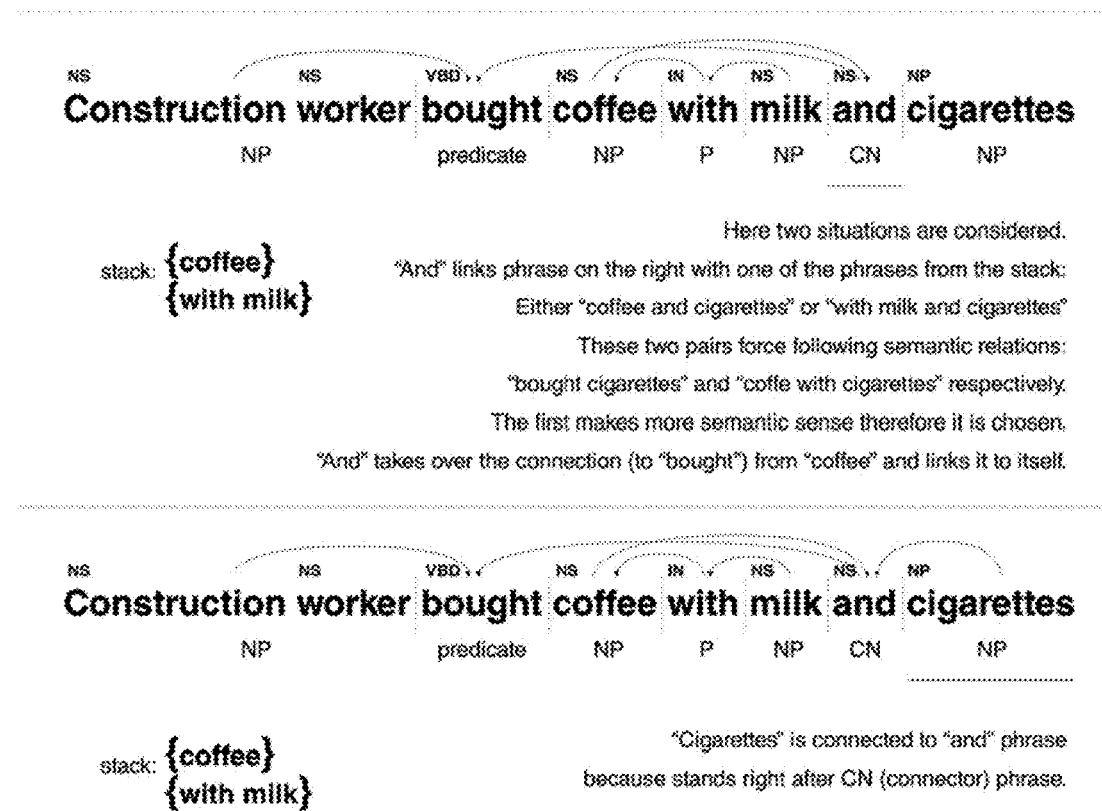

FIGS. 18-23 are diagrams illustrating a process of the accommodator 203D module according to an embodiment. Referring to FIG. 18, the input to the accommodator module 203D is the sentence "Construction worker bought coffee with milk and cigarettes." Phrases are created by minor manipulation of scraps, such as merging, dividing and changing the type of scraps. Then phrases are connected. In this instance, "construction worker" is first connected to a predicate because of its position. The "construction worker" phrase is added to a stack of phrases. In an embodiment, only NP and P phrases can be added to the stack. Referring to FIG. 19, and continuing phrase connection, the predicate "bought" is by default connected to the root. The "construction worker" phrase is removed from the stack because of the appearance of the predicate. Then "coffee" is connected to the predicate because of noun-verbal proximity, and this phrase is put on the stack. In the following operation, two situations are considered. Either "with" connects the phrase on the right with one from the top of the stack, or "with" connects the phrase on the right with the predicate. The first solution is better semantically, therefore this one is selected. Next, "milk" is connected to the "with" because it stands immediately after a preposition, and "with milk" is added to the stack. Referring to FIG. 20 and continuing with phrase detection, two further situations are considered. "And" links the phrase on the right with one of the phrases from the stack: either "coffee and cigarettes" or "with milk and cigarettes". These two pairs force the following semantic relationships: "bought cigarettes" and "coffee with cigarettes", respectively. The first makes more sense semantically, therefore it is chosen, and it takes over the connection to "bought" from "coffee" and links it to itself. "Cigarettes" is then connected to the "and" phrase because it stands immediately after a CN (connector) phrase.

Referring to FIG. 21, the phrases are then classified. The "Construction worker" phrase gets SUBJECT for its type because of its position and connection to the predicate. The predicate phrase type was assigned earlier by the clause divider module 203C. The "coffee" phrase gets OBJECT for its type because of its position and relationship to the predicate. The "with" scrap type is changed to a PREPOSITION phrase type. Referring to FIG. 22, the classification of phrases continues. The "milk" phrase gets ATTRIBUTE for its type because of its relationship to a preposition phrase. "And" gets CONNECTOR for its type because it links other phrases "Cigarettes" gets OBJECT for its type because of its relationship to a particular connector.

The next operation is word categorization. The word "construction" gets a specifier component because it is a noun specifying a phrase core. Referring to FIG. 23, word categorization continues. The rest of the words in the sentence are classified as core components because they are single within corresponding phrases and are not modifying any other phrases. Next, words are connected within phrases. All specifying words are connected to the core of the respective phrase. Other words in the sentence are not considered here because they are single within their corresponding phrases.

Methodology for Improving Language Decoder and Resolving Exceptions

Figure 24:
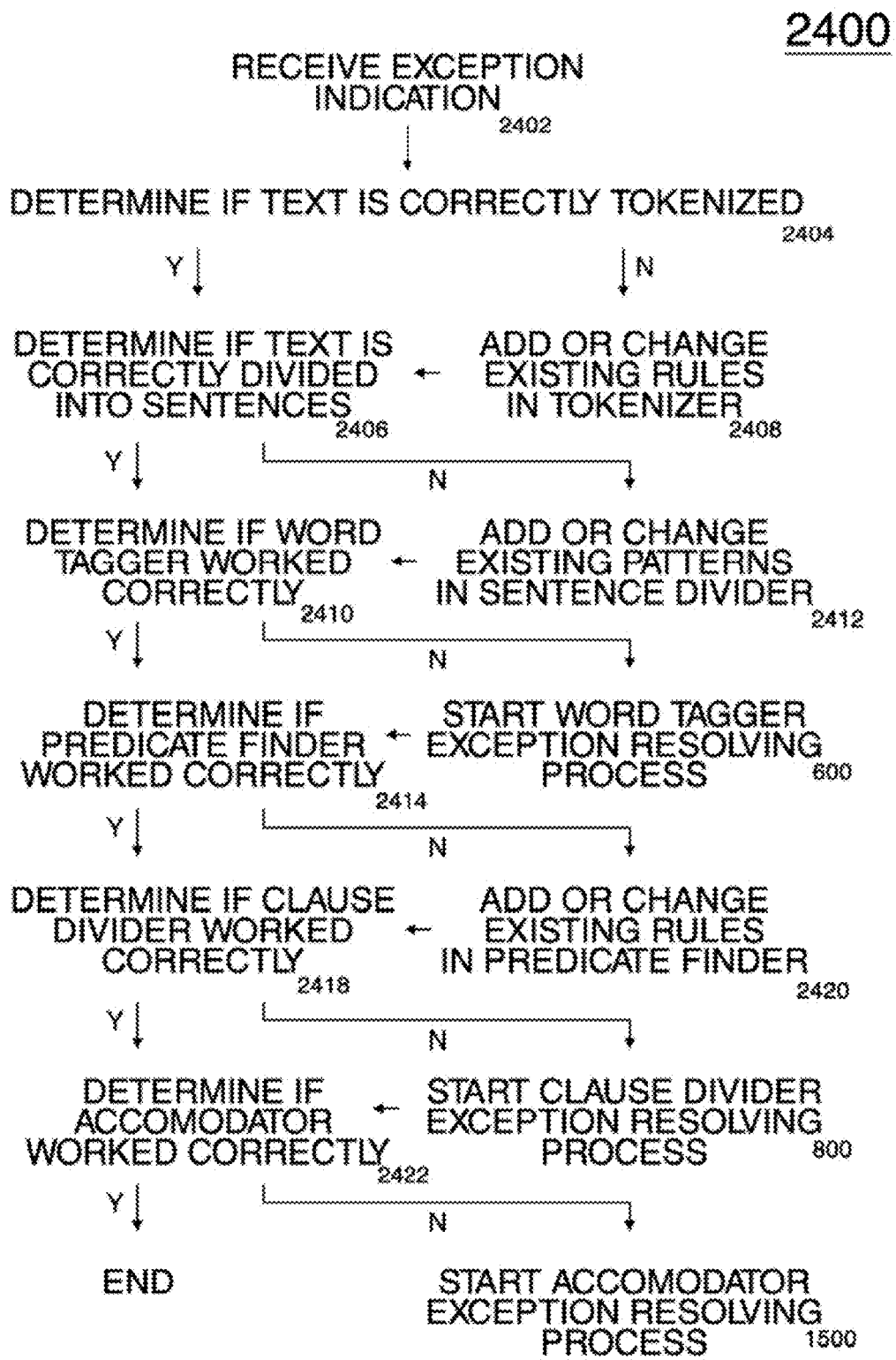
FIG. 24 is a flow diagram of a Language Decoder updating or exception handling method according to an embodiment.

FIG. 24 is a flow diagram illustrating method 2400 of improving the Language Decoder or modifying the Language Decoder as exceptions occur according to an embodiment. Exceptions include failure of the Language Decoder on any level tokenization, sentence division, word tagging, predicate finder, clause divider or accommodator.

At 2402 an exception indication is received within the system. It is determined if the input text is correctly tokenized (2404). If not, adding or changing existing rules in the tokenizer is performed (2408), and the process proceeds to 2406, determining whether the text is correctly divided into sentences. If at 2406 the text is not correctly divided into sentences, adding or changing existing rules in the sentence divider is performed (2412), and then it is determined if the word tagger worked correctly (2410). 2410 is also performed if the test is correctly divided into sentences as determined at 2406. If the word tagger did not work correctly, then a word tagger exception resolution process 600 is initiated, (see FIG. 6).

After the changes (600) it is determined whether the predicate finder worked correctly (2414). If not, adding or changing existing rules in the predicate finder is performed (2420).

After the changes (2420) or in case if it is determined (2418) that the clause divider worked correctly (2418) it is then determined whether the clause divider worked correctly (2418). If not, clause divider exception resolving process (800) is started see FIG. 8).

After the changes (800) or if it is determined (2418) that the clause divider worked correctly, it is then determined whether the accommodator worked correctly (2422). If not, an accommodator exception resolving process is started (1500). If the accommodator worked correctly, the process is at an end.

The above methodology of resolving exceptions to the system may become an automated process.

LD Output as a Three-Level Framework of Information Interface

The output of the LD module 203 is a three-level framework for storing information (words, phrases and clauses). The three-level structure enables efficient organization of information. Embodiments of a three-level LD output framework capture a maximum amount of the information coded into text while maintaining the simplest possible structure for easy access. In an embodiment, an efficient framework is designed for storing information and then using only algorithms written by humans (rather than machine learning techniques and a corpus) to decode the information from any given text. The output of the LD thus conveys the logical structure of information stored in text, along with the grammatical structure.

The three-level LD output structure is compositional and predictable and consists of a relatively small number of elements on each level. Having a minimal set of components and relations speeds up the learning process, simplifies writing extraction rules, and can reduce chances of miscategorization. The output of the LD is effectively an easy-to-access interface standardizing the information coded into natural language.

Description of the Three-Level Framework

A three-level structure consisting of word-level, phrase-level and clause-level stores the information coded in text. The LD 203 is a three-level structure, irrespective of the text processed through the system. The text could be short, simple sentences written in proper grammar, short non-proper grammar, twitter content, or long non-proper grammar reviews. This contrasts with prior systems, in which the parameters are responsible for attributes and the structure at the same time, which can produce varying results depending on the context of some fragment of text.

In an example from BACKGROUND section
1. John likes math.
2. John likes to learn.
3. John likes learning math in the evening.

When using the LD parser in each case one gets consistent notation for the object which John likes. In the first example "math" is an object, in the second example "to learn" is an object clause (its role is the same, but on a different level), and in the third example "learning math in the evening" is also an object clause. This approach allows separation of the grammatical layer from the logical layer, so that a single rule can cover many different syntactic structures of the sentence.

As a result information extraction rules written on top of the LD are efficient. Fewer rules need to be written to capture more information, and the information is less ambiguous.

FIG. 25 is a diagram of a three-level output structure for LD 203 according to an embodiment. In an embodiment a word is a minimal unit of information. Combinations of words (possibly also one-element) form a reference to some entity, concept, action etc. The word's meaning can only be understood in the context of the phrase to which it belongs and this is described in the LD 203 by a word component. The connection further indicates which other word inside the phrase is directly concerned by the role of the former. In an embodiment, a phrase is a group of words which acts as a single unit referring to some entity, action etc. A combination of phrases in a clause can produce a minimal statement that can be part of a more elaborate message. The internal meaning of a clause (neglecting its context, which is managed by the clause level) is determined by contained phrases and their relations. The role of a given phrase in the clause is represented in the LD by the phrase type and the connection indicates to which other phrase this type relates.

In an embodiment, a clause is a group of phrases that form a single minimal statement. Its internal meaning can be analyzed separately (and this is done by the LD 203 on a phrase level), but only its context in combination with other clauses can lead to understanding the text and its meaning. This is caused by the fact that the original, literal meaning of the clause is often significantly altered by its relation towards some other clauses. The LD 203 provides such information about relations between clauses as well as their functions in the whole utterance.

The three-level framework consists of elements on each level and allows for the addition of layers storing new kinds of information. This three-level structure allows integration of the decoded information with semantic databases (e.g. Freebase™, Wordnet™), ontologies, and taxonomies in order to add additional semantic information into existing components on the phrase and/or word level.

The clause level has an additional layer of information about the tense (e.g. present simple, past simple) and construction (e.g. positive, negative, question). In an embodiment, different layers of information are kept separate for several reasons. Layers of abstraction can be easily formed by combining only the relevant types of information and ignoring the others (e.g. if one needs only information about phrases division and not their types). It is possible to add other, new layers (e.g. coreference) in addition to the existing ones without distorting the already present information thanks to the separation of layers.

The three level framework can be seen and treated as an interface for information extraction from text. The information can be coded into different layers of the text. For example, in "He owns that red car" the information about the car is described as "red" on the word level. In "The boy threw that ball" the information about which object was thrown is coded on a phrase level. In "It started to rain after we got home" the circumstances are stored on the clause level. It is also possible to include higher levels on which the information can be stored, e.g. the causation can be seen as a pattern of clauses connected with certain nodes ("[If] you eat too much chocolate [then] your stomach will hurt"), therefore the information is coded into a higher level than the clause level. Likewise it is possible to include yet higher levels, building patterns on top of other patterns. The three-level framework of the LD output reflects the that natural division of information into separate levels and provides fundaments for creating higher level patterns to capture information stored in multiple sentences.

Language Decoder Query Language (LDDC)

1 General Description and Purpose

LDQL 204 is a declarative, domain-specific querying language for text-structuring the output of the NLP system's information extraction process. It is based on first-order predicate calculus and enables users to predefine their own formulas (including recursive definitions).

LDQL 204 queries can express a wide range of actions—from simply listing all subjects, to actions as complicated as finding opinions about people.

LDQL 204 queries have SQL-like syntax, which is relatively easy to write and read for a human operator, and does not require linguistic knowledge from the operator. The queries can be also created automatically, which is described below.

In an embodiment, the implementation of the LDQL 204 is optimized for the LD 203, however LDQL 204 can also be implemented for other text-structuring NLP systems, e.g. Stanford Parser or Illinois SRL.

It is possible (e.g. with the use of LD 203 and LDQL 204) to formulate queries in natural language, and then translate them to [high-level] LDQL 204 queries.

2 LDQL in comparison to other query languages

There are some prior-art query languages which were used for NLP (e.g. Prolog, SPARQL, IQL). As compared with them, LDQL 204 has some unique features:

it was designed for querying NLP parsers' output: its types and relations reflect a three-level information structure, regardless of particular parser's output structure, it is based on full first-order predicate calculus, users can define their own formulas (including recursive ones) within the language, and use them in queries, or other definitions.

LDQL 204 queries have SQL-like syntax a SELECT section containing goals of extraction, an optional FROM section for fixing the search range (search by clauses, sentences, or whole text at once), and an optional WHERE section, containing restrictions on extracted objects in the form of (syntactically sugared) first-order formulas, where the variables range over a three-level structure of words, phrases and clauses (regardless of particular parser's output structure).

For example, to extract pairs of subject-predicate phrases from given text we could use the following LDQL 204 query:

```
SELECT P:sub AS Actor,
    P:prd AS Action
  FROM clauses
  WHERE sub phrase_type='subject'
  AND prd phrase_type='predicate'
  AND sub->prd
```

LDQL's orientation towards formula composition encourages users to building new formulas out of previously defined ones, which we consider crucial in dealing with natural language's complexity, for example instead of the following pair of queries.

```
SELECT P:x,P:y
  WHERE x.phrase_type='subject'
  AND y.phrase_type='object'
  AND x.phrase_core_base='crocodile'
  AND EXISTS P:z (z.phrase_type='predicate'
    AND x->z
      AND y->z);
```

```
SELECT P:q,P:w
  WHERE q.phrase_type='subject'
  AND w.phrase_type='object'
  AND w.phrase_core_base='lamb'
  AND EXISTS P:z (z.phrase_type='predicate'
    AND q->z
      AND w->z)
```

We would rather abstract the common pattern for finding "subject→predicate←object" connection:

```
DEFINE subobj_connection(P:s,P:o) AS
s.phrase_type='subject'
 AND o.phrase_type='object'
 AND EXISTS P:p (p.phrase_type='predicate'
    AND s->p
    AND o->p)
SELECT P:x,P:y
 WHERE x.phrase_core_base='crocodile' AND subobj_connection(x,y);
SELECT P:x,P:y
 WHERE y.phrase_core_base='lamb' AND subobj_connection(x,y)
``` which makes the queries more "granular", and thus easy to maintain (in analogy with subroutines in imperative programming languages)

This represents the first use of full first-order query language for unstructured text information extraction. The presence of an EXISTS quantifier (in addition to the Boolean connectives AND, OR and NOT present in e.g. SQL, Prolog or—in some flavor—SPARQL) with the ability to write recursive formula definitions makes LDQL 204 an expressively stronger formalism than e.g. pure SQL, Prolog or even SPARQL (which may have some quantification constructs, but no recursive formula definitions). An example, a benefit of having such an expressive power (also present in e.g. Gödel, or—indirectly—Cypher, or any imperative language like Java) is the ability to describe closures of relations:
Suppose we would like to know whether two phrases are linked by a sequence of one or more "→f" connections. In LDQL 204 we could simply write a recursive formula:

```
DEFINE linked(P:x,P:y) AS
    x!=y
    AND (x->y
        OR EXISTS P:z (z!=x
            AND z!=y
            AND x->z
            ND NOT z->x
            AND linked(z,y)))
```

Which literally reads "x and y are linked if x→y or x→z for some z, such that z is linked with y"—notice the circularity (recursion). Because of LDQL's expressive strength, some measures need to be taken to avoid infinite evaluations (the "x→z AND NOT z→x" and "z!=x AND z!=y" restrictions).

3 Merging LDQL with External Systems

LDQL 204 could be implemented to operate on the output of any NLP text-structuring system (e.g. Stanford Parser), provided that the implementation will provide access to attributes that the given system offers.

LDQL 204 can be connected to external semantic bases (e.g. Freebase, Wordnet), lexical data bases (e.g. Wordnet), domain-specific data bases, ontologies, word banks, taxonomies, etc in order to support it with more semantic content.

LDQL 204 rules can be hand-written, generated automatically or semi-automatically by either connecting LDQL 204 to sources of semantic content (as above), or by machine learning means (in the case of LD's output it is possible to extract common structures out of annotated text corpora by means of unification heuristics or e.g. Koza's genetic programming), or both, or generated semi-automatically by merging any of the methods mentioned.

4. LDQL Implementation

Figure 35:
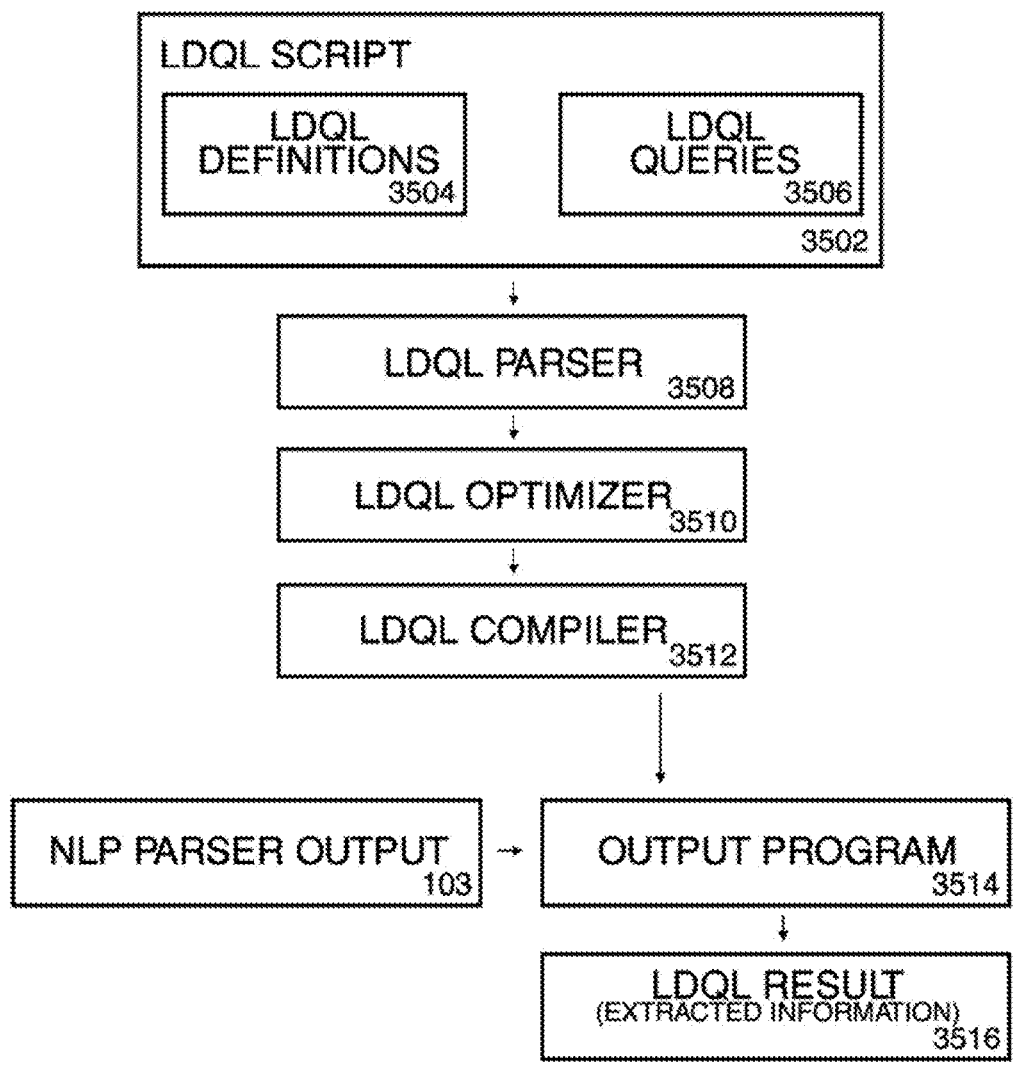
FIG. 35 is a diagram of a Language Decoder Query Language implementation of a Language Decoder according to an embodiment.

FIG. 35 is a diagram of an LDQL 204 implementation 3500 for the LD 203 according to an embodiment. The implementation consists of three modules: parser, optimizer and compiler.

The LDQL parser module 3508 processes text of LDQL script 3502 (i.e. list of definitions 3504 and lists of queries 3506) in order to produce its abstract representation.

The optimizer module 3510 takes the output of parser 3508 and performs additional annotations to guide an LDQL compiler module 3512

The compiler module 3512 takes an annotated abstract representation and generates a php/c/some-imperative-language output program 3514 which, given valid NLP parser output 103, returns the query's results 3516 for that output.

Figure 26:
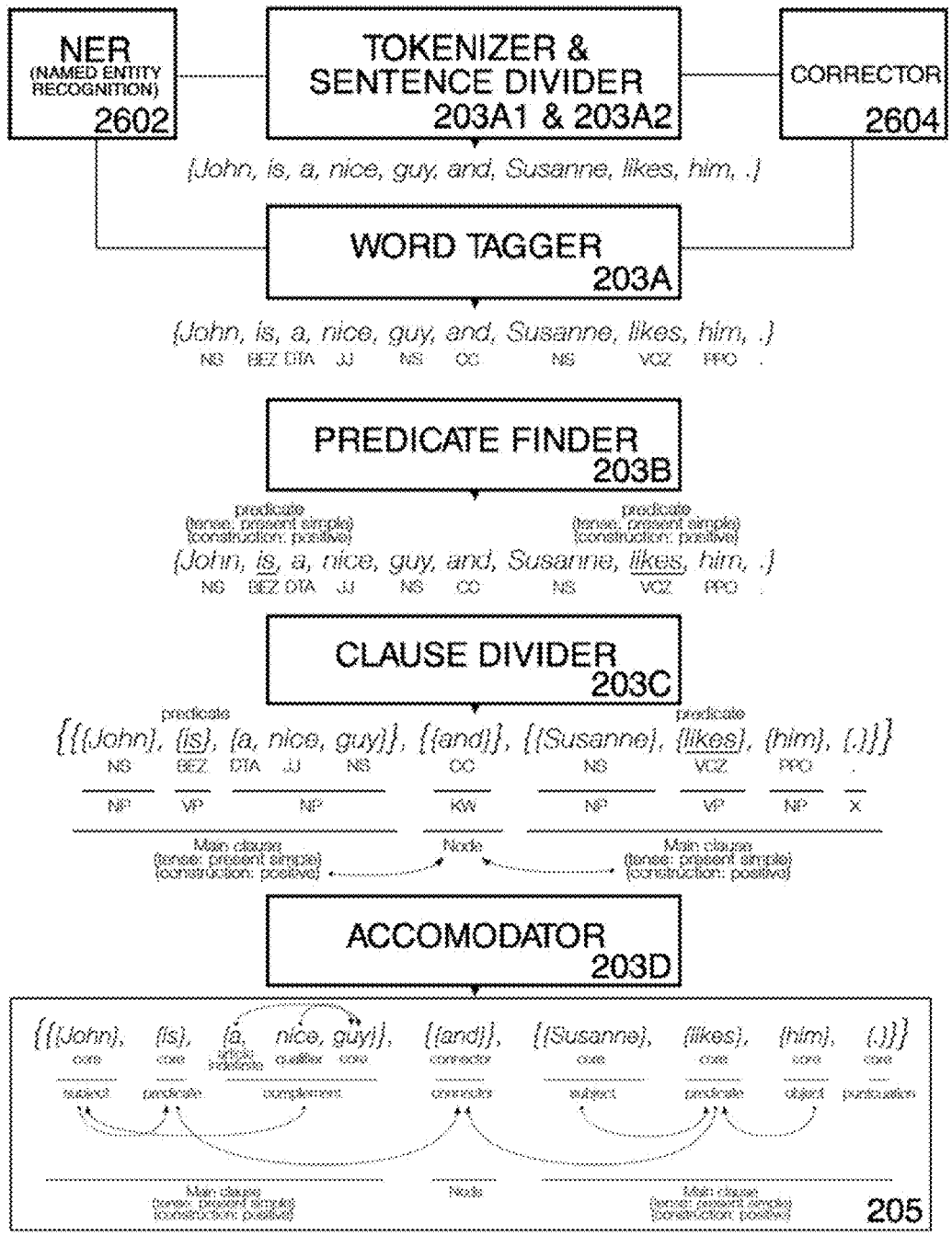
FIG. 26 is a diagram illustrating the operation of a language decoder (LD) according to an embodiment.

FIG. 26 is a diagram summarizing the operation of the LD 203 is an example according to an embodiment. In this example, the text input is the sentence "John is a nice guy and Susanne likes him." Tokenizer 203A1 and sentence divider 203A2 divide the input text into separate words grouped into sentences (a single sentence is shown here as an example). A corrector module 2604 cooperates with the tokenizer 203A1, the sentence divider 203A2 and the word tagger 203A and applies rules to improve the text input, for example by fixing typos in the input. A named entity recognition module 2602 locates and classifies elements such as names of persons, names of organizations, names of locations, etc.

The word tagger 203A labels each word with a tag from the proprietary tagset previously described. The predicate finder 203B builds predicates from verb components. Then the clause divider 203C joins words into scraps, groups them into separate clauses, and determines relationships and types of those clauses. Next the accommodator 203D converts scraps within clauses into phrases and determines relationships and types of those phrases. At the end of the process, the accommodator determines types and relationships of each word within each phrase. The output 205 of the accommodator as shown is in a human readable form in contrast to tree-style output of various prior systems. The original sequence of the input words is preserved and the relationships, types, tags, etc are simple to view.

Figure 27:
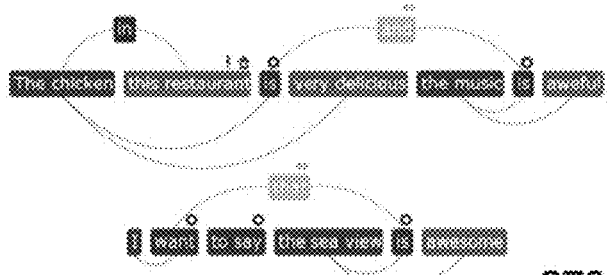
FIG. 27 is a diagram illustrating an overview of an information extraction methodology according to an embodiment.

FIG. 27 is a diagram illustrating a process of information extraction from plain text according to an embodiment. This is an example of what is achieved by a software application (generally an example of a software application 106) written to apply LDQL 204 rules for a specific purpose of extracting information from multiple plain text online reviews. The input text "The chicken in this restaurant is very delicious and the music is awful! I want to say the sea view is awesome!" is operated on by LD 203, which outputs (2702) the sentences in the form of naked API 205, which as previously described maintains the original word sequence. Previously chosen LDQL rules are applied (2704) to the output of the LD process, and the result is a two-column table (subject and complement) 2706 that lists the sea view is awesome, the chicken is very delicious, and the music is awful. This tabulated output is easily accessed for further operations.

With using output of Language Decoder it is possible to build language understanding applications or language understanding engines. It can be done by applying on top of LD one or more of the following LDQL rules, raw code (e.g. PHP, Java, C#, NET, C++), machine learning algorithms (supervised or unsupervised).

Usage of Language Decoder

The Language Decoder is the component technology for building applications in many areas including (but not limited to)
    Information Extraction
    Sentiment Analysis and Extraction
    Event and Relationship Extraction
    Opinion Mining
    Text Mining
    Document indexing
    Text Summarization/curation of information
    Speech processing
    Question&Answering
    Text proofing
    Translations
    Natural Language Search/Structured Search
    Query expansion
    Automated scoring (essay scoring)

The Language Decoder may be used to process any type of texts including (but not limited to).
    User generated content,
    Social media content, microblogging (e.g. twitter)
    Reviews (e.g. review sites content, websites, wikipedia, etc)
    Formal language documents
    Articles and news Biomedical free text
Research papers
Systems built on top of the language decoder can represent many domains including (but not limited to):
Big data
Customer feedback analytics
Social listening/sentiment analytics
Email analysis
Text Analytics
Search
Voice Search
Advertising
Predictive Analytics
Google Glasses and other augmented reality devices
Voice interface Information Extraction Example: Knowledge Browser Bubble visualization is a concept of showing a multi-level structure of knowledge representation (LDQL extracted) in a form of clickable bubbles. This representation can vary in size, color and position of bubbles representing frequency and additional properties (for example, the color palette can represent polarity of detected object sentiments). This multi-level approach allows a user to browse (e.g. zoom in or zoom out) through summarized knowledge encoded in analysed text, which can help to understand the wider context of the data along with more exact properties of extracted data.

This concept does not restrict data to a specific format or order. Pairs (object—opinion), triplets, quadruples (suggestion, aim, suggestion modifier, aim modifier), and many more are all suitable here. Also, additional categorization can be applied on top of extracted data to improve knowledge integrity and understanding. This can be achieved in multiple ways, starting from applying external lexicons or semantic databases (e.g. Freebase, FrameNet), through human made categorization to logical correlations.

The bubble visualization concept is used in the information extraction example application described below.

FIGS. 28-34 illustrate a user interface of a knowledge browser application. In this example, the knowledge browser is for San Francisco restaurants, but any other subject matter is possible. The knowledge browser is an embodiment of an application 106 that can help people to quickly learn, what they want to know about San Francisco restaurants. By summarizing some reviews about eateries to a very user-friendly form of so-called bubbles, users can browse through multiple food-oriented categories and find exactly what people said about particular aspects of their experiences in restaurants. The knowledge browser application illustrates some of the possibilities for applying LDQL 204 rules to user-written reviews processed by the LD 203. The rules used in this example are built to extract pairs of entities (object and related opinion) from user-generated reviews.

Figure 28:
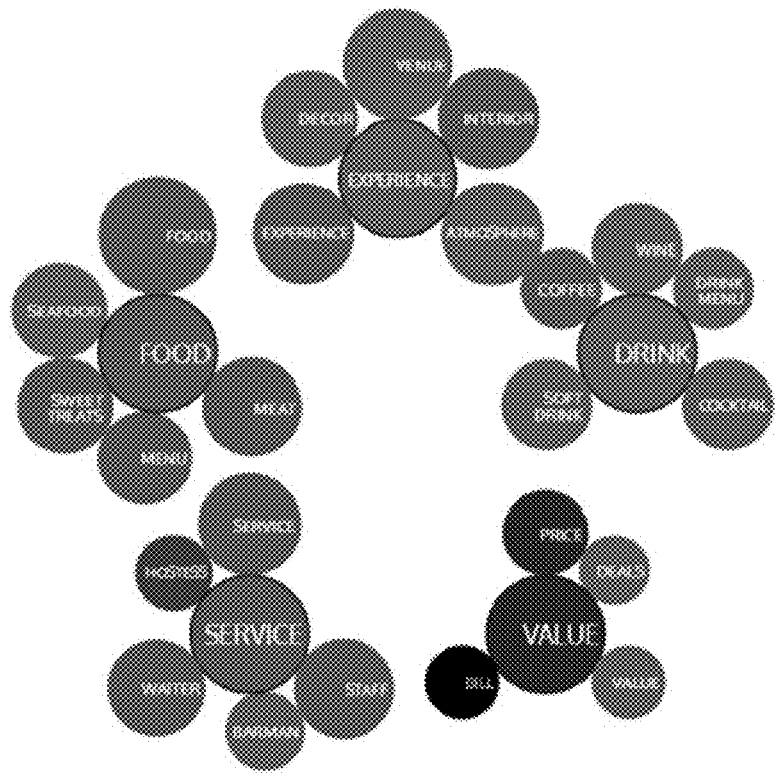

With reference to FIG. 28, after choosing a particular restaurant (by search input or by clicking on one from a list of popular restaurants), the application displays a set of bubbles grouped into five clusters. The central bubble of each cluster represents a different meta-category. Each meta-category has different sets of category bubbles attached to it. This set depends on what people wrote in reviews about chosen restaurant.

Figure 29:
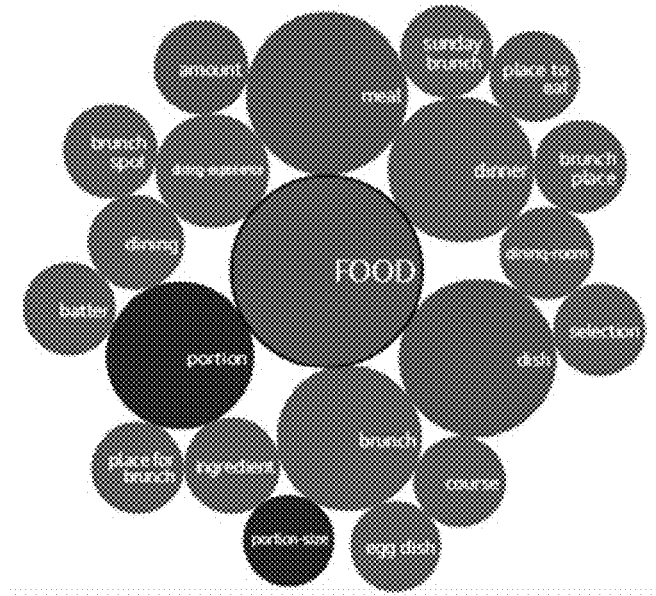

With reference to FIG. 29, after clicking on a category bubble, the application displays a set of extracted objects attached to the chosen category (FOOD in this example). Bubbles can differ in size and color to visually convey information. In this example, the size of a bubble represents object frequency in processed user reviews. More frequent objects appear on bigger bubbles. The present example shows that people wrote more about meal and dish than course or amount. The color of a bubble can vary from green through orange to red to represent the sum of positive and negative opinions about the particular object. In the present example object portion has relatively more negative opinions than object brunch so it is closer to being red in color.

Figure 30:
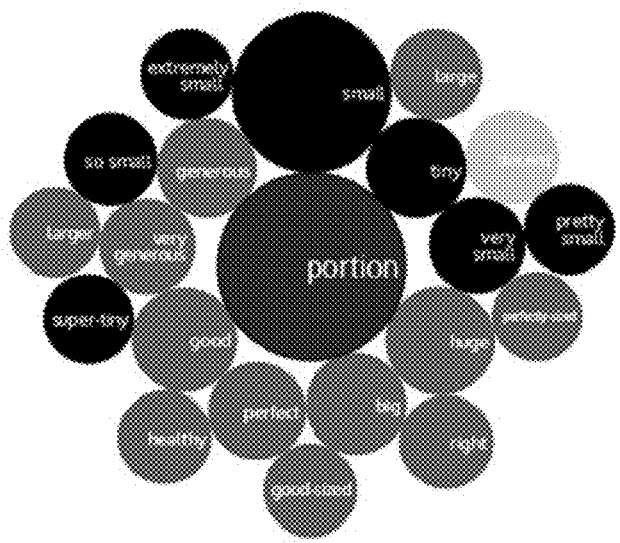

With reference to FIG. 30, after clicking on an object bubble, the application shows the set of opinions about the chosen object (portion in this example). Bubbles can differ in size and color here as well. Here, the size of a bubble or radius represents opinion about the particular object frequency in processed user reviews. In this example small portion appeared more frequently in reviews than good portion. In an embodiment, the color of the opinion bubble is constrained to three values: red, green and grey. Red opinions are meant to be negative, green positive and grey are treated as neutral. In this example opinions about size of a portion are rather negative (small, tiny, extremely small) but opinions about general quality of portion are certainly positive (good, perfect, healthy).

Figure 31:
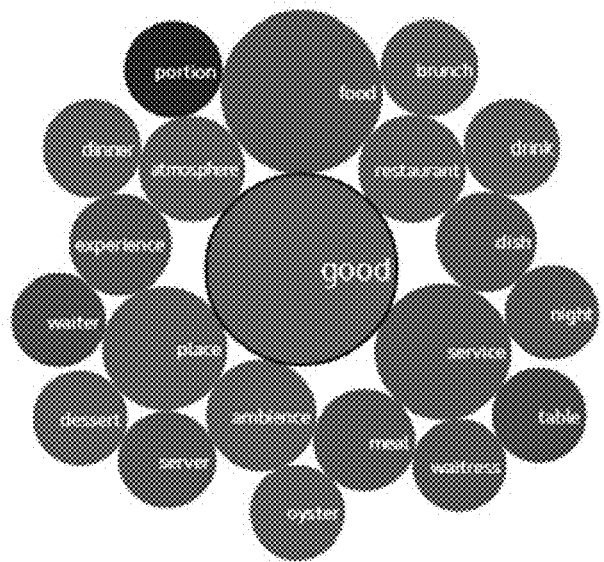

Referring to FIG. 31, double clicking on an opinion bubble shows a general view of every object, which was connected to the chosen opinion. This view gives a better insight into what generally, despite categorization, was related to the chosen opinion (good in this example). For example, the user can look up what was good in the selected restaurant. Bubbles shown in this screen have the same properties (color and size) as in previous screens.

Figure 32:
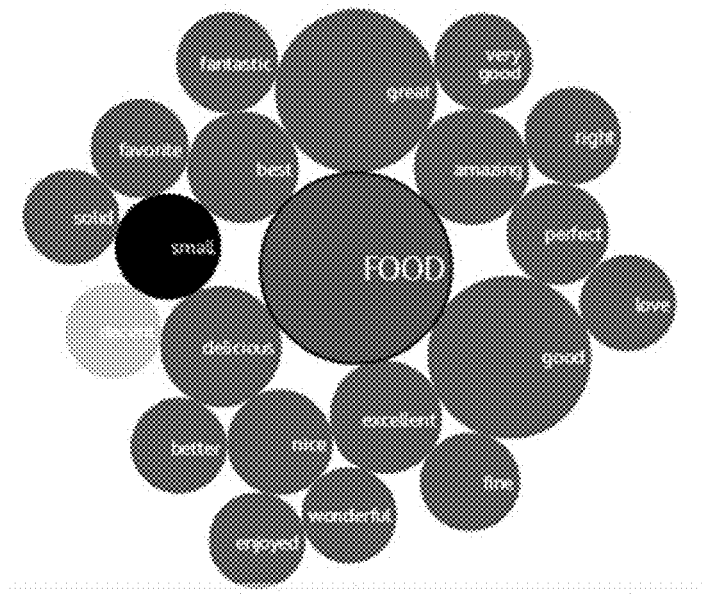

Referring to FIG. 32, a similar view can be obtained by clicking on a central category bubble on the screen of FIG. 28. This displays a graphic of a set of opinions about an entire category (FOOD in this example), which means that all of those opinion bubbles are related to some objects categorized as FOOD.

Referring to FIGS. 33 and 34, the application provides an option for comparing two restaurants. By placing two instances of bubbles next to each other, the user can browse through categories and objects in one instance (representing "restaurant one") and simultaneously choices are transferred to the second instance ("restaurant two") showing differences.

Bubble size and bubble color are just examples of visual properties that can be used to convey the desired information. Any other visual characteristic that can be varied in a similar manner would be just as appropriate.

The various functions or processes disclosed herein may be described as data and/or instructions embodied in various computer-readable media, in terms of their behavioral, register transfer, logic component, transistor; layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the internet and/or other computer networks via one or more data transfer protocols (e.g., HTTP, FTP, SMTP, etc) When received within a computer system via one or more computer-readable media, such data and/or instruction-based expressions of components and/or processes under the system described may be processed by a processing entity (e.g., one or more processors) within the computer system in conjunction with execution of one or more other computer programs.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word any of the items in the list, all of the items in the list and any combination of the items in the list.

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

While certain aspects of the systems and methods are presented below in certain claim forms, the inventors contemplate the various aspects of the systems and methods in any number of claim forms. For example, while only one aspect of the systems and methods may be recited as embodied in machine-readable medium, other aspects may likewise be embodied in machine-readable medium. Accordingly, the inventors reserve the right to add additional claims after filing the application to pursue such additional claim forms for other aspects of the systems and methods.

What is claimed is:

1. A system for natural language processing comprising:
a processor configured to execute a natural language processing method, the method comprising,
 the processor receiving input data from one or more data sources, wherein the input data comprises one or more of plain text, and tokenized text;
 the processor tokenizing the text;
 the processor aggregating tokens into a three-level structure comprising a word level, a phrase level, and a clause level wherein,
  tokens are aggregated into words, words are aggregated into phrases, and phrases are aggregated into clauses;
  each element on a higher level comprises one or more elements of a lower level;
  tokens that are one or more of coordinating and subordinating words within a phrase are aggregated into one or more words that are separate from respective, coordinated or subordinated words, and the one or more of coordinating and subordinating words and their respective, coordinated or subordinated words are aggregated into one phrase;
  words that are one or more of coordinating and subordinating phrases within a clause are aggregated into one or more phrases that are separate from respective, coordinated or subordinated phrases, and the one or more of coordinating and subordinating phrases and their respective, coordinated or subordinated phrases are aggregated into one clause; and
  phrases that are one or more of coordinating and subordinating clauses are aggregated into one or more clauses that are separate from their respective coordinated or subordinated clauses;
 the processor determining syntactic connections between at least,
  every clause and its syntactically superior clause in the same sentence;
  every clause and its syntactically superior phrase, if they exist within the same sentence;
  every phrase and its syntactically superior phrase within the same clause; and
  every word and its syntactically superior word within the same phrase; and wherein,
   an element without its syntactically superior element becomes a root element;
   if one or more coordinated elements have a common syntactically superior element, the coordinated elements are connected to their respective coordinating element, and the coordinating element is connected to the element which is syntactically superior to the respective coordinated elements; and
   if one or more coordinated elements are all syntactically superior to an element, the syntactically subordinated element is connected to the element coordinating its respective syntactically superior elements; and
 the processor classifying each word, phrase and clause, wherein
  classification reflects a syntactic function of the word, the phrase and the clause; and phrases and clauses share a partially common set of possible syntactic functions comprising at least subject, object, complement and attribute function.

2. The system of claim 1, wherein the natural language processing method comprises executing a plurality of functional modules for performing a natural language processing function, and wherein the processor is further configured to execute a clause divider module of the plurality of functional modules comprising:

the processor receiving text divided into words from one or more of, another of the plurality of modules, and input data, wherein input data comprises data from a system external to the natural language processing system;

the processor grouping the words into clauses;

the processor determining connections between the clauses; and the processor classifying the clauses.

3. The system of claim 2, wherein grouping the words into clauses comprises the processor considering sequences of one or more words to be grouped into clauses, wherein:

the sequences of words are aggregated into clauses in an order in which they appear in the input data; and the decision to aggregate the sequence of one or more words into particular clauses is influenced by decisions regarding previous sequences, and a current state of the clauses at the time of considering the sequence.

4. The system of claim 3, wherein grouping the words into clauses comprises the processor first preliminarily choosing words that are probable to divide clauses.

5. The system of claim 3, wherein the clause divider module comprises a correctness evaluator configured to continually assess the correctness of the clause division process and wherein the clause divider module employs a set of rules for dividing words into clauses, the rules comprising:

default instructions; and alternative instructions used when default instructions cause an error detected by the correctness evaluator.

6. The system of claim 1, wherein the natural language processing method comprises executing a plurality of functional modules for performing a natural language processing function, and wherein the processor is further configured to execute an accommodation module of the plurality of functional modules comprising:

the processor receiving text divided into words from one or more of, another of the plurality of modules, and input data, wherein input data comprises data from a system external to the natural language processing system;

the processor grouping the words into phrases;

the processor determining connections between the phrases; and the processor classifying the phrases.

7. The system of claim 6, wherein:

determining connections between the phrases comprises considering the phrases in an order in which they appear in the input data;

determining connections is influenced by the decision regarding connections of previous phrases.

8. The system of claim 6, wherein one or more of determining connections between the phrases and classification of phrases comprises using a semantic n-gram database.

9. The system of claim 6, wherein determining connections between the phrases comprises performing a test to determine the most probable of different possible connections.

10. The system of claim 9, wherein the test comprises evaluating whether replacement of certain phrases changes the sense of other phrases in a context of the input data.

11. The system of claim 10, wherein the test uses a semantic n-gram database to evaluate whether replacement of certain phrases changes a sense of other phrases in a context of the input data.

12. The system of claim 1, wherein one or more of aggregation into groups, determining connection between elements, and classifying the elements.

13. A computer-implemented method for processing text, the method comprising:

a processor configurable to execute a natural language processing application receiving input data from one or more data sources, wherein the input data comprises one or more of plain text, and tokenized text;

the processor tokenizing the text;

the processor aggregating tokens into three-level structure comprising word level, phrase level and clause level, wherein, tokens are aggregated into words, words into phrases and phases into clauses;

each element on lower level is assigned to exactly one element of higher level;

each element on higher level comprises one or more elements of lower level;

tokens that are coordinating or subordinating words within a phrase are aggregated into one or more words that are separate from their respective coordinated or subordinated words, and both the coordinating or subordinating words and their respective coordinated or subordinated words are aggregated into one phrase;

words that are coordinating or subordinating phrases within a clause are aggregated into one or more phrases that are separate from their respective coordinated or subordinated phrases, and both the coordinating or subordinating phrases and their respective coordinated or subordinated phrases are aggregated into one clause; and phrases that are coordinating or subordinating clauses are aggregated into one or more clauses that are separate from their respective coordinated or subordinated clauses;

the processor determining syntactic connections between at least every clause and its syntactically superior clause at the same sentence;

every clause and its syntactically superior phrase if exists within the same sentence;

every phrase and its syntactically superior phrase within the same clause; and every word and its syntactically superior word within the same phrase, and wherein:

element without its syntactically superior element becomes root element;

if one or more coordinated elements have common syntactically superior element, the coordinated elements are connected to their respective coordinating element, and the coordinating element is connected to the element which is syntactically superior to the respective coordinated elements; and if one or more coordinated elements are all syntactically superior to an element, the syntactically subordinated element is connected to the element coordinating its respective syntactically superior elements; and the processor classifying each word, phrase and clause, wherein, classification reflects syntactic function of the word, the phrase and the clause; and phrases and clauses share partially common set of possible syntactic functions comprising at least subject, object, complement and attribute function.

14. The method of claim 13 further comprising the processor executing a plurality of modules for performing a natural language processing function, wherein the method further comprises executing a clause divider module of the plurality of modules comprising:

the processor receiving text divided into words from one or more of, another of the plurality of modules, and input data, wherein input data comprises data from a system external to the natural language processing system;

the processor grouping the words into clauses;

the processor determining connections between the clauses; and the processor classifying the clauses.

15. The method of claim 14, wherein grouping the words into clauses comprises considering sequences of words to be grouped into clauses, wherein:

the sequences of words are aggregated into clauses in an order in which they appear in the input data; and the decision to aggregate the sequence of one or more words into a particular clause is influenced by decisions regarding previous sequences and a current state of clauses at the time of considering the sequence.

16. The method of claim 15, wherein grouping the words into clauses comprises first preliminarily choosing words that are probable to divide clauses.

17. The method of claim 15, wherein the clause divider module comprises a correctness evaluator for continually assessing the correctness of the clause division process, and wherein the clause divider module employs a set of rules for dividing words into clauses, the rules comprising:

default instructions; and alternative instructions used when default instructions cause an error detected by the correctness evaluator.

18. The method of claim 13, further comprising the processor executing an accommodation module of the plurality of modules comprising:

the processor receiving text divided into words from one or more of, another of the plurality of modules, and input data, wherein input data comprises data from a system external to the natural language processing system, and;

the processor grouping words into phrases;

the processor determining connections between the phrases; and the processor classifying the phrases.

19. The method of claim 18, wherein determining connections between the phrases comprises considering the phrases in an order in which they appear in the input data; and the decision regarding determining connection is influenced by decision regarding the connections of previous phrases.

20. The method of claim 18, wherein one or more of determining connections between phrases and classification of phrases comprises using a semantic n-gram database.

21. The method of claim 18, wherein determining connections between phrases comprises the processor performing a test to determine the most probable of different possible connections.

22. The method of claim 21, wherein the test comprises evaluating whether replacement of certain phrases changes the sense of other phrases in a context of the input data.

23. The method of claim 22, wherein the test uses a semantic n-gram database to evaluate whether replacement of certain phrases changes the sense of other phrases in a context of the input data.

24. The method of claim 13, wherein one or more of aggregation into groups, determining connection between elements, and classifying the elements, is based on rules comprising rules that are not generated using machine learning techniques.

\* \* \* \* \*